United States Patent
Jiang et al.

(10) Patent No.: US 12,469,674 B2
(45) Date of Patent: Nov. 11, 2025

(54) PHOTO-ELECTRICAL EVOLUTION DEFECT INSPECTION

(71) Applicant: ASML Netherlands B.V., Veldhoven (NL)

(72) Inventors: Jun Jiang, San Jose, CA (US); Chih-Yu Jen, San Jose, CA (US); Ning Ye, San Jose, CA (US); Jian Zhang, San Jose, CA (US)

(73) Assignee: ASML Netherlands B.V., Veldhoven (NL)

( * ) Notice: Subject to any disclaimer, the term of this patent is extended or adjusted under 35 U.S.C. 154(b) by 367 days.

(21) Appl. No.: 17/638,765

(22) PCT Filed: Aug. 26, 2020

(86) PCT No.: PCT/EP2020/073908
§ 371 (c)(1),
(2) Date: Feb. 25, 2022

(87) PCT Pub. No.: WO2021/037944
PCT Pub. Date: Mar. 4, 2021

(65) Prior Publication Data
US 2022/0270849 A1 Aug. 25, 2022

Related U.S. Application Data

(60) Provisional application No. 62/894,573, filed on Aug. 30, 2019.

(51) Int. Cl.
*H01J 37/28* (2006.01)
*G01R 31/307* (2006.01)

(52) U.S. Cl.
CPC ............ *H01J 37/28* (2013.01); *G01R 31/307* (2013.01); *H01J 2237/0048* (2013.01); *H01J 2237/24592* (2013.01); *H01J 2237/2817* (2013.01)

(58) Field of Classification Search
CPC ............... H01J 37/28; H01J 2237/0048; H01J 2237/24592; H01J 2237/2817; G01R 31/307; G01R 31/2831
See application file for complete search history.

(56) References Cited

U.S. PATENT DOCUMENTS

| | | | |
|---|---|---|---|
| 6,252,412 B1 | 6/2001 | Talbot et al. | |
| 6,344,750 B1 * | 2/2002 | Lo | G01R 31/307 |
| | | | 850/10 |

(Continued)

FOREIGN PATENT DOCUMENTS

| | | |
|---|---|---|
| CN | 104364877 A | 2/2015 |
| CN | 105789007 A | 7/2016 |

(Continued)

OTHER PUBLICATIONS

Wikipedia contributors. (Aug. 22, 2019). Laser diode. In Wikipedia, The Free Encyclopedia. Retrieved 15:58, Apr. 16, 2024, from https://en.wikipedia.org/w/index.php?title=Laser_diode&oldid=911958401 (Year: 2018).*

(Continued)

*Primary Examiner* — Robert H Kim
*Assistant Examiner* — Christopher J Gassen
(74) *Attorney, Agent, or Firm* — FINNEGAN, HENDERSON, FARABOW, GARRETT & DUNNER LLP

(57) ABSTRACT

A charged particle beam system may include a primary source, a secondary source, and a controller. The primary source may be configured to emit a charged particle beam along an optical axis onto a region of a sample. The secondary source may be configured to irradiate the region of the sample. The controller may be configured to control the charged particle beam system to change a parameter of an output of the secondary source. A method of imaging may include emitting a charged particle beam onto a region of a (Continued)

sample, irradiating the region of the sample with a secondary source, and changing a parameter of an output of the secondary source. A method of detecting defects may include inspecting a sample, generating a first defect distribution, and generating a second defect distribution.

17 Claims, 16 Drawing Sheets

(56) References Cited

U.S. PATENT DOCUMENTS

| | | | |
|---|---|---|---|
| 10,276,346 | B1 | 4/2019 | Duffy et al. |
| 2005/0200841 | A1 | 9/2005 | Talbot et al. |
| 2005/0218325 | A1* | 10/2005 | Nishiyama ............ H01J 37/026 250/311 |
| 2008/0111069 | A1 | 5/2008 | Notte |
| 2011/0036981 | A1 | 2/2011 | Zhao et al. |
| 2011/0204228 | A1 | 8/2011 | Tsuno et al. |
| 2014/0175279 | A1 | 6/2014 | Agemura |
| 2020/0088659 | A1 | 3/2020 | Ma et al. |

FOREIGN PATENT DOCUMENTS

| | | |
|---|---|---|
| CN | 107111118 A | 8/2017 |
| CN | 109243953 A | 1/2019 |
| DE | 102018202728 A1 | 8/2019 |
| TW | 445561 B | 7/2001 |
| TW | 1398898 B1 | 6/2013 |

OTHER PUBLICATIONS

International Search Report and Written Opinion issued by the International Searching Authority in related International Application No. PCT/EP2020/073908, mailed Jan. 19, 2021 (18 pgs.).

Office Action issued by the Intellectual Property Office (IPO) in related ROC (Taiwan) Patent Application No. 109128940, issued Oct. 28, 2021 (11 pgs.).

* cited by examiner

PHOTO-ELECTRICAL EVOLUTION DEFECT INSPECTION

CROSS-REFERENCE TO RELATED APPLICATIONS

This application claims priority to International Application No. PCT/EP2020/073908, filed Aug. 26, 2020, and published as WO 2021/037944 A1, which claims priority of U.S. application 62/894,573 which was filed on Aug. 30, 2019. The contents of these applications are incorporated herein by reference in their entireties.

FIELD

The description herein relates to systems and methods of imaging that may be useful in the field of charged particle beam systems, and more particularly, to evolution of a source that may be used for detecting defects during sample inspection.

BACKGROUND

In manufacturing processes of integrated circuits (ICs), unfinished or finished circuit components may be inspected to ensure that they are manufactured according to design and are free of defects. One way of detecting defects is by voltage contrast imaging. In voltage contrast imaging, a charged particle beam system may scan a primary beam across a sample while secondary irradiation is applied to add a surface charge to the sample.

Applying secondary irradiation on a wafer in charged particle beam inspection may allow for various enhancements. For example, voltage contrast may be applied in a charged particle inspection system to enhance a method of distinguishing features based on grey level of the features. To detect voltage contrast defects, typically a pre-charging process may be employed in which charged particles are applied onto an area to be inspected before conducting the inspection. Pre-charging may cause the difference between grey level of defective and non-defective structures to be amplified. Thus, voltage contrast may enhance imaging such that defective features and surrounding non-defective features behave differently under inspection and allow certain defects to become detectable. Voltage contrast may also improve the signal to noise ratio (SNR) of an inspection method.

SUMMARY

Embodiments of the present disclosure provide systems and methods for imaging based on charged particle beams. In some embodiments, there may be provided a charged particle beam system that includes a primary source, a secondary source, and a controller. The primary source may be configured to emit a charged particle beam along an optical axis onto a region of a sample. The secondary source may be configured to irradiate the region of the sample. The controller may have circuitry and may be configured to control the charged particle beam system to change a parameter of an output of the secondary source. The controller may be configured to acquire a first image of the sample at a first parameter of the output of the secondary source, and acquire a second image of the sample at a second parameter of the output of the secondary source.

There may also be provided a method of imaging that includes emitting a charged particle beam onto a region of a sample, irradiating the region of the sample with a secondary source, acquiring a first image of the sample at a first parameter of an output of the secondary source, changing a parameter of the output of the secondary source, and acquiring a second image of the sample at a second parameter of the output.

There may also be provided a method of detecting defects that includes inspecting a sample, generating a first defect distribution, and generating a second defect distribution. Inspecting the sample may include using a charged particle beam incident on a region of the sample and irradiating the region of the sample with a secondary source. Generating the first defect distribution may be done at a first value of a parameter of an output of the secondary source. Generating the second defect distribution may be done at a second value of the parameter.

It is to be understood that both the foregoing general description and the following detailed description are exemplary and explanatory only and are not restrictive of the disclosed embodiments, as may be claimed.

BRIEF DESCRIPTION OF THE DRAWINGS

The above and other aspects of the present disclosure will become more apparent from the description of exemplary embodiments, taken in conjunction with the accompanying drawings.

DETAILED DESCRIPTION

Figure 1A:
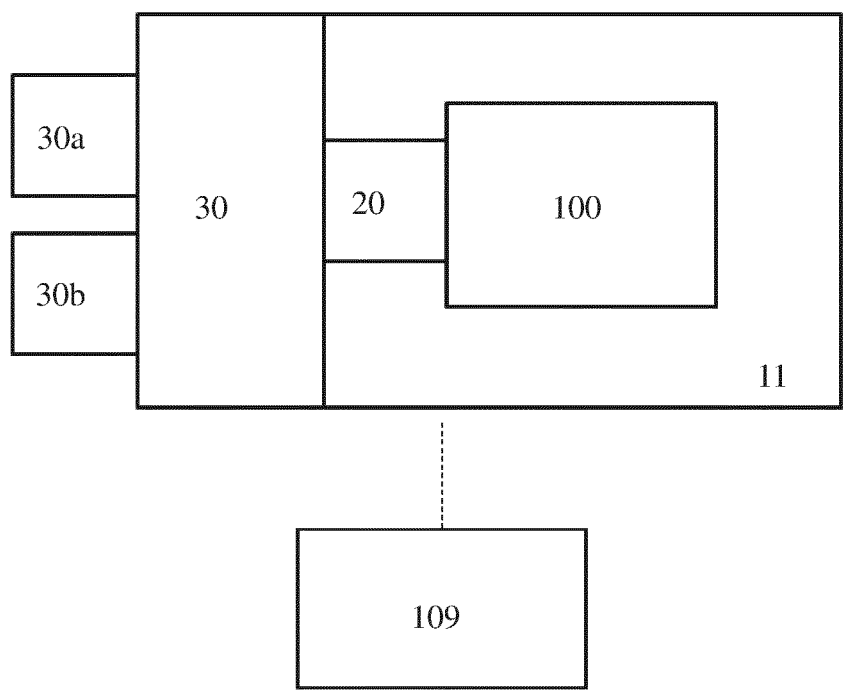
FIGS. 1A and 1B are schematic diagrams illustrating an exemplary electron beam inspection (EBI) system, consistent with embodiments of the present disclosure.

Reference will now be made in detail to exemplary embodiments, examples of which are illustrated in the drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses, systems, and methods consistent with aspects related to subject matter that may be recited in the appended claims.

Electronic devices are constructed of circuits formed on a piece of silicon called a substrate. Many circuits may be formed together on the same piece of silicon and are called integrated circuits or ICs. With advancements in technology, the size of these circuits has decreased dramatically so that many more of them can fit on the substrate. For example, an IC chip in a smart phone can be as small as a thumbnail and yet may include over 2 billion transistors, the size of each transistor being less than 1/1,000th the size of a human hair.

Making these extremely small ICs is a complex, time-consuming, and expensive process, often involving hundreds of individual steps. Errors in even one step have the potential to result in defects in the finished IC, rendering it useless. Thus, one goal of the manufacturing process is to avoid such defects to maximize the number of functional ICs made in the process, that is, to improve the overall yield of the process.

One component of improving yield is monitoring the chip making process to ensure that it is producing a sufficient number of functional integrated circuits. One way to monitor the process is to inspect the chip circuit structures at various stages of their formation. Inspection can be carried out using a scanning electron microscope (SEM). A SEM can be used to image these extremely small structures, in effect, taking a "picture" of the structures. The image can be used to determine if the structure was formed properly and also if it was formed in the proper location. If the structure is defective, then the process can be adjusted so the defect is less likely to recur.

An image of a wafer may be formed by scanning a primary beam of a SEM system over the wafer and collecting particles (e.g., secondary electrons) generated from the wafer surface at a detector. The image may show various features on the wafer surface with differing levels of brightness. The image may be in greyscale. Thus, the brightness of the features may be referred to as the "grey level," with the brighter the feature, the higher its grey level. To detect voltage contrast defects, the grey level of a feature may be compared with that of a reference feature. For example, the grey level of a plug (e.g., a column of material extending through the substrate) may be compared with that of surrounding plugs. The plugs may be designed to be identical, but if their grey levels are different, it may reveal that some plugs are defective or have other differing characteristics. Determining whether a feature is defective or not may be based on a difference in grey level between features, which may be compared to a threshold to determine if the difference is attributable to noise or if the feature is actually defective. Some defects may be difficult to detect because the difference in grey level may be relatively small and may not surpass the detection threshold.

The process of detecting voltage contrast defects may involve applying a charge to a sample and observing the effects of the charge (e.g., effects on the particles generated from the wafer surface). In some cases, charge may be deposited on the sample before imaging in a process called pre-charging. In this case, the charge may be generated by the same primary beam that is used for imaging (e.g., in a process called pre-scanning) or by a separate flood gun, for example. In some other cases, charge may be generated contemporaneously with imaging. In this case, the charge may be generated by the primary beam or some other source. Because there may be a source separate from the primary source that generates the primary beam of the SEM that is used together in generating the charge, this other source may be referred to as a "secondary source" that may emit "secondary irradiation." The process of using voltage contrast in defect detection may include comparing two separate images. A first image may be acquired without an added charge. A second image may then be acquired with charge added by a secondary irradiation generated by a secondary source. The secondary source may be a diode that emits a laser, for example. In the first image, the primary beam of the charged particle beam apparatus may be projected on the wafer and secondary electrons may be collected at the detector. In the second image, the primary beam may be projected on the wafer while the laser is also being projected on the wafer. This may cause changes in the secondary electrons that are collected at the detector (e.g., the number or energy of secondary electrons) and may result in the second image showing features with a different grey level than that of the first image.

Comparing the two images may allow for enhancements in defect detection. For example, in the second image, with the laser on, the grey level of a defective plug in comparison to its surroundings may be greater than that in a first image, with the laser off. Therefore, there may be a greater chance that the defective plug shows a difference in grey level that surpasses a threshold, and thus becomes detectable. Shining the secondary source on the sample may enhance the sensitivity of voltage contrast defect detection.

However, it may not always be the case that applying charge with a secondary source causes an observable effect. For example, with some features, the grey level of a defective plug in the second image (with the laser on) may not substantially change compared to that in the first image (with the laser off). That is, a comparison between the first and second images may not reveal any additional information. Comparing the grey levels of features based on only one laser-on state may be insufficient to enable detection of some defects. Additionally, even when structures appear to have similar geometry, there may be differences in other characteristics of features that are difficult to detect, such as differences in composition (e.g., make-up) of the features.

To enhance current methods of inspection and defect detection, it may be effective to vary a parameter of the secondary source (e.g., power level) and to compare multiple images when the secondary source irradiates the sample at different parameters (e.g., taking multiple pictures at different power levels, frequencies, etc., of secondary irradiation). A method of evolving defect inspection may involve varying parameters of the secondary source and acquiring multiple images. With multiple images, multiple data points may be obtained for the same feature, and thus, a trend in behavior with respect to a parameter (e.g., power level of the secondary source) may become evident. The trend in grey level variation may be used to ascertain additional information from the imaged features. For example, instead of just a single data point indicating grey level change between a laser-off state and a laser-on state, a curve indicating the behavior of grey level variation over a range of various laser-on states can be obtained. This additional information may be useful in detecting defects. Or, the information may be useful in distinguishing features which might otherwise appear identical. For example, an inspected feature's resulting curve may be compared to other features' curves, and the overall shape of the curve may show that the feature has different characteristics from the others. This may constitute additional information about the feature that had not previously been explored. The additional information may be useful in identifying defects. Furthermore, the additional information may have other uses, such as determining a wafer signature. The wafer signature may represent information of systematic characteristics of the wafer, such as process parameters, and may be useful in process tuning. Thus, there are various potential uses of the extra information obtainable using the methods of the present disclosure.

Embodiments of the disclosure may address some issues of defect detection based on only single data point grey level comparisons. For example, curves comprising multiple data points may be obtained for inspected features in which grey level is determined across a range of values of a parameter (e.g., different power levels of a laser used as a secondary source). This may enhance the sensitivity of a defect detection method and may enable the method to capture both structural and compositional differences of features. Some embodiments may employ multiple ways of varying parameters of the secondary source, such as varying both power and wavelength of the laser. The parameters may be varied in real-time (e.g., during a single inspection process). Dynamic e-beam inspection with a high level of flexibility may be provided.

Objects and advantages of the disclosure may be realized by the elements and combinations as set forth in the embodiments discussed herein. However, embodiments of the present disclosure are not necessarily required to achieve such exemplary objects or advantages, and some embodiments may not achieve any of the stated objects or advantages.

Without limiting the scope of the present disclosure, some embodiments may be described in the context of providing detection systems and detection methods in systems utilizing electron beams ("e-beams"). However, the disclosure is not so limited. Other types of charged particle beams may be similarly applied. Furthermore, systems and methods for evolving a source or for detecting defects may be used in other imaging systems, such as optical imaging, photon detection, x-ray detection, ion detection, etc.

As used herein, unless specifically stated otherwise, the term "or" encompasses all possible combinations, except where infeasible. For example, if it is stated that a component includes A or B, then, unless specifically stated otherwise or infeasible, the component may include A, or B, or A and B. As a second example, if it is stated that a component includes A, B, or C, then, unless specifically stated otherwise or infeasible, the component may include A, or B, or C, or A and B, or A and C, or B and C, or A and B and C.

Reference is now made to FIG. 1A, which illustrates an exemplary electron beam inspection (EBI) system 10 that may be used for source evolution, consistent with embodiments of the present disclosure. EBI system 10 may include a scanning electron microscope (SEM) and may be used for imaging. EBI system 10 may include a dual-source output. As shown in FIG. 1A, EBI system 10 includes a main chamber 11 a load/lock chamber 20, an electron beam tool 100, and an equipment front end module (EFEM) 30. Electron beam tool 100 is located within main chamber 11. EFEM 30 includes a first loading port 30a and a second loading port 30b. EFEM 30 may include additional loading port(s). First loading port 30a and second loading port 30b receive wafer front opening unified pods (FOUPs) that contain wafers (e.g., semiconductor wafers or wafers made of other material(s)) or samples to be inspected (wafers and samples may be collectively referred to as "wafers" herein).

One or more robotic arms (not shown) in EFEM 30 may transport the wafers to load/lock chamber 20. Load/lock chamber 20 is connected to a load/lock vacuum pump system (not shown) which removes gas molecules in load/lock chamber 20 to reach a first pressure below the atmospheric pressure. After reaching the first pressure, one or more robotic arms (not shown) may transport the wafer from load/lock chamber 20 to main chamber 11. Main chamber 11 is connected to a main chamber vacuum pump system (not shown) which removes gas molecules in main chamber 11 to reach a second pressure below the first pressure. After reaching the second pressure, the wafer is subject to inspection by electron beam tool 100. Electron beam tool 100 may be a single-beam system or a multi-beam system. A controller 109 is electronically connected to electron beam tool 100, and may be electronically connected to other components as well. Controller 109 may be a computer configured to execute various controls of EBI system 10. While controller 109 is shown in FIG. 1A as being outside of the structure that includes main chamber 11, load/lock chamber 20, and EFEM 30, it is appreciated that controller 109 can be part of the structure.

Figure 1B:
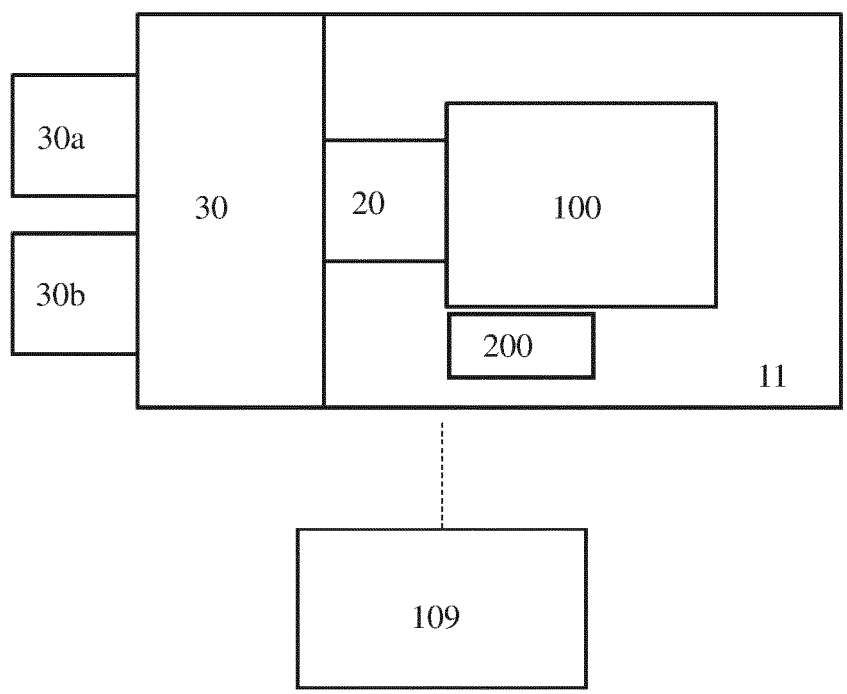

FIG. 1B shows another example of EBI system 10. As shown in FIG. 1B, EBI system 10 may include a secondary source 200. Secondary source 200 may be configured to provide secondary irradiation to a sample. Secondary source 200 may be configured to emit light toward the sample. Secondary source 200 may be configured to project a beam of photons onto the sample. Secondary source 200 may include a laser.

A charged particle beam microscope, such as that formed by or which may be included in EBI system 10, may be capable of resolution down to, e.g., the nanometer scale, and may serve as a practical tool for inspecting IC components on wafers. With an e-beam system, electrons of a primary electron beam may be focused at probe spots on a wafer under inspection. The interactions of the primary electrons with the wafer may result in secondary particle beams being formed. The secondary particle beams may comprise backscattered electrons, secondary electrons, or Auger electrons, etc. resulting from the interactions of the primary electrons with the wafer. Characteristics of the secondary particle beams (e.g., intensity) may vary based on the properties of the internal or external structures of the wafer, and thus may indicate whether the wafer includes defects.

The intensity of the secondary particle beams may be determined using a detector. The secondary particle beams may form beam spots on a surface of the detector. The detector may generate electrical signals (e.g., a current, a voltage, etc.) that represent intensity of the detected secondary particle beams. The electrical signals may be measured with measurement circuitries (e.g., analog-to-digital converters) to obtain a distribution of the detected electrons. The electron distribution data collected during a detection time window, in combination with corresponding scan path data of the primary electron beam incident on the wafer surface, may be used to reconstruct images of the wafer structures under inspection. The reconstructed images may be used to reveal various features of the internal or external structures of the wafer and may be used to reveal defects that may exist in the wafer.

However, current e-beam inspection techniques may suffer from low sensitivity when applied to certain types of defects (e.g., plug leakage, short, or open defects). Furthermore, e-beam inspection techniques may not be sensitive to material composition (e.g., doping levels). This may limit sensitivity and throughput.

Techniques employing secondary irradiation, such as voltage contrast (VC), may amplify imaging effects in e-beam inspection such that some additional defects become detectable, however, additional limitations may be encountered. For example, certain defects may not become detectable unless a certain amount of secondary irradiation is used. In some cases, features on a wafer may appear identical although actual differences in structure or composition may exist. For example, grey level of variation between a laser-on state and a laser-off state of two different features may be the same unless a specific amount of laser power is used. However, the amount of secondary irradiation (such as the laser power level) may be set to only one level and may not be adjustable. Thus, the difference between two seemingly identical features may go undetected.

Additionally, current e-beam inspection techniques may not support dynamic inspection. An example of dynamic inspection may include a technique of performing inspection while varying landing energy of a charged particle beam. In some cases, an e-beam system may take a relatively long time for the system to become stable. For example, operating an e-beam system may require performing a degaussing function such that stable levels of magnetic field are formed between a wafer and components of the system. E-beam systems may take time before stability is reached, and therefore, it may be difficult to apply dynamic inspection techniques.

Figure 2:
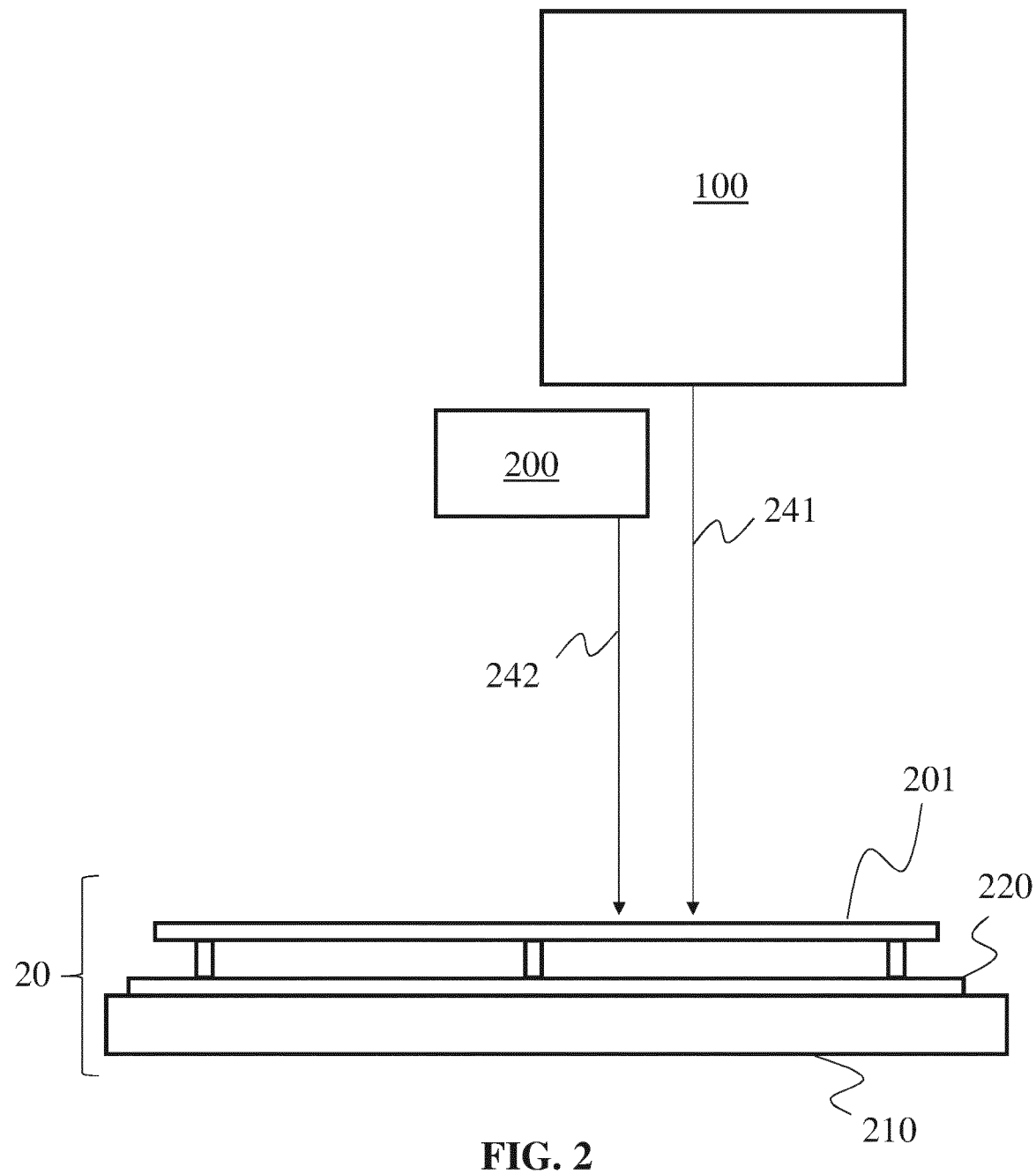
FIG. 2 is a schematic diagram of an exemplary arrangement of a wafer included in a load/lock chamber, consistent with embodiments of the present disclosure that may be a part of the exemplary electron beam inspection system of FIG. 1B.

FIG. 2 illustrates an exemplary arrangement of a wafer 201 that may be included in load/lock chamber 20, and the wafer's interactions with electron beam tool 100 and secondary source 200. Structures may be provided for holding wafer 201 within EBI system 10. Load/lock chamber 20 may include a platform. Components of load/lock chamber 20 may constitute a wafer holder. For example, as shown in FIG. 2, load/lock chamber 20 may include a bottom plate 220 disposed on a stage 210 with wafer standoffs provided for holding wafer 201. Stage 210 may be movable.

Electron beam tool 100 may be configured to generate a primary beam 241 that may be projected on wafer 201. Electron beam tool 100 may include a primary source configured to emit a charged particle beam along an optical axis onto a region of a sample, such as wafer 201. The optical axis of the primary source may be configured to be perpendicular to the sample. Stage 210 may be adjusted so that X, Y, Z positions, tilt, angular orientation, etc. of wafer 201 can be fine-tuned. Stage 210 may be moved to align a desired inspection area on wafer 201 to be within a field of view (FOV) of electron beam tool 100. The FOV of electron beam tool 100 may be defined by the range through which electron beam tool 100 is configured to deflect primary beam 241. In some embodiments, electron beam tool 100 may include a large-FOV device that may be configured to scan primary beam 241 across a broad area on wafer 201. In some embodiments, electron beam tool 100 may be configured to generate and may deflect a plurality of beams toward wafer 201. That is, electron beam tool 100 may include a multi-beam tool. In some embodiments, electron beam tool 100 may be configured to project primary beam 241 straight down while stage 210 is configured to move wafer 201 through a variety of scan positions.

Secondary source 200 may be included in EBI system 10. Secondary source 200 may be configured to provide secondary irradiation to wafer 201. Secondary source 200 may be configured to generate a secondary irradiating beam 242. As used herein, "secondary irradiating beam 242" refers to a beam generated by secondary source 200 and should not be confused with beams of secondary charged particles that may be generated from interactions with primary beam 241 and wafer 201 and which may ultimately travel to a detector. Secondary source 200 may be configured to project secondary irradiating beam 242 toward the inspection area on wafer 201. Secondary source 200 and electron beam tool 100 may be configured to project their respective beams toward the same target. Electron beam tool 100 and secondary source 200 may be configured to emit their respective beams at an incline relative to a perpendicular line extending from the plane of wafer 201. In some embodiments, a beam spot formed by secondary irradiating beam 242 on wafer 201 may be larger than that formed by primary beam 241. That is, irradiation by secondary source 200 may cover a wider area on wafer 201 than a beam spot formed by primary beam 241. In some embodiments, both primary beam 241 and secondary irradiating beam 242 may be focused to a pinpoint location on wafer 201. Secondary source 200 may be configured to follow a scan path of electron beam tool 100. For example, electron beam tool 100 and secondary source 200 may be configured to both scan across a sample. In some embodiments, secondary source 200 may be fixed (and does not scan) while electron beam tool 100 scans across the sample. Furthermore, although FIG. 2 may schematically show secondary source 200 as being separate from electron beam tool 100 (e.g., being spaced apart by some distance), in some embodiments, secondary source 200 may be installed on the primary column of electron beam tool 100 and be configured to point at the FOV of electron beam tool 100. Secondary source 200 may be included in electron beam tool 100. For example, in some embodiments, the source of electron beam tool 100 may also act as secondary source 200 depending on the configuration of electron beam tool 100.

In some embodiments, electron beam tool 100 may be configured to operate in a first mode in which primary irradiation is emitted and a second mode in which secondary irradiation is emitted. U.S. patent application Ser. No. 16/053,636 (published as U.S. Pub. No. 2019-0043691 A1), which is herein incorporated by reference in its entirety, discusses examples of a charged particle beam tool configured to operate in a first mode and a second mode.

Electron beam tool 100 and secondary source 200 may be included in a dual-output source. The dual-output source may be configured to emit both electrons and photons. For example, the dual-output source may be configured to emit primary beam 241 and secondary irradiating beam 242.

Secondary source 200 may include a diode. The diode may be a light emitting diode (LED). Secondary source 200 may include a laser diode. Secondary source 200 may be configured to generate irradiation that may produce an observable effect in a material of wafer 201. For example, wafer 201 may include semiconductor structures. Features on wafer 201 may be sensitive to a particular type of irradiation. Such features may respond to incidence of photons. Features of wafer 201 may be configured to generate charges due to a photoelectric effect. For example, wafer 201 may include transistors that may include PN junctions, as discussed below.

One application of semiconductor manufacturing may include computer memory. Static random access memory (SRAM) devices may be formed on a substrate, such as wafer 201. SRAM devices may be formed by manufacturing processes including tungsten chemical mechanical polishing (WCMP). Features formed by WCMP are one of the most commonly encountered targets of e-beam inspection. Voltage contrast defect detection is popular in e-beam inspection of WCMP features because of, for example, its capability to detect electrical defects, such as open contacts and short circuits. An "open" or a "short" defect may refer to a feature that is buried underneath conducting plugs, or may be associated with high aspect ratio structures, such as vias or contacts. Open and short defects may be difficult to detect by other methods, such as optical inspection.

Figure 3:
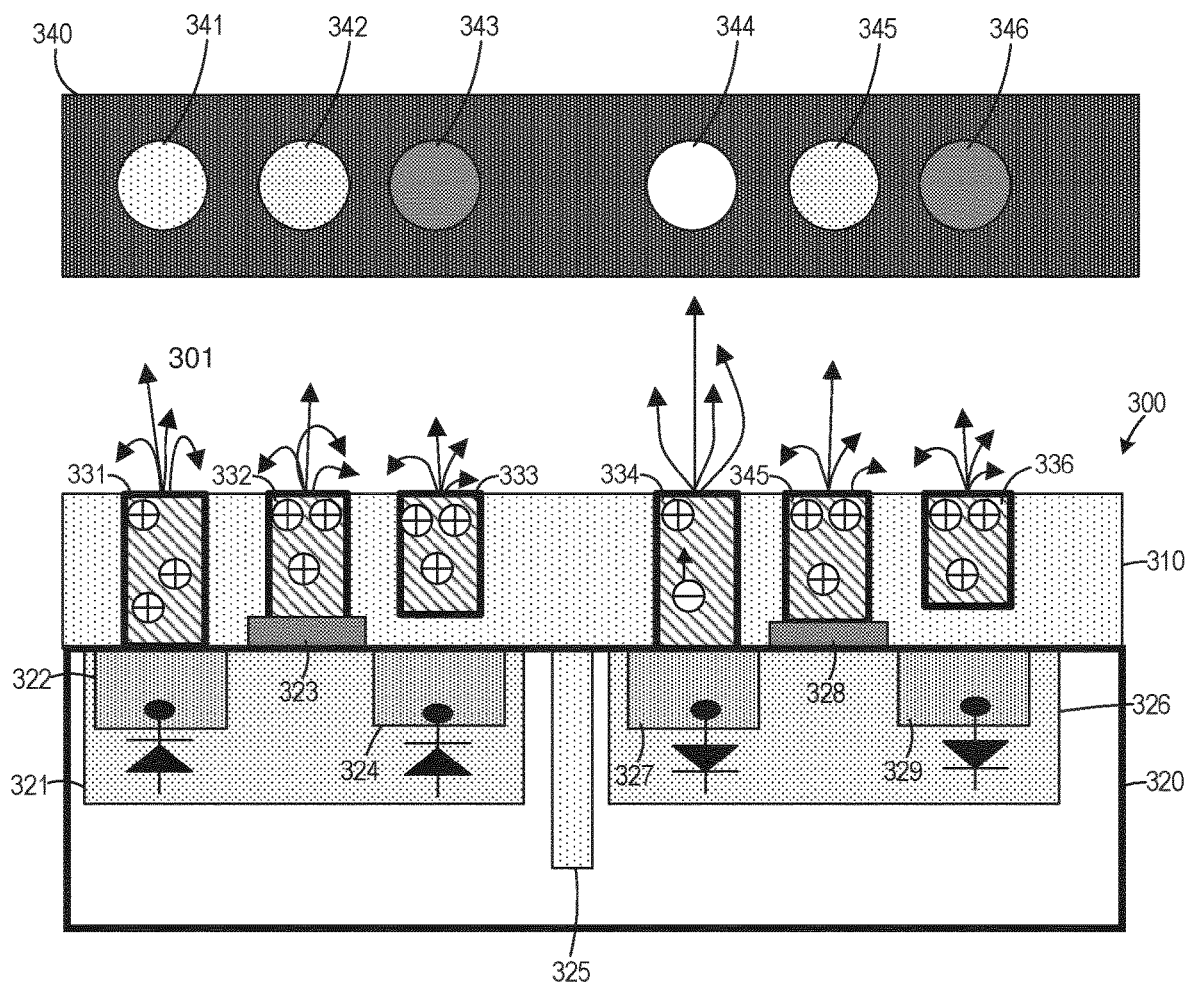
FIG. 3 is a diagram illustrating an effect of performing voltage contrast (VC) defect inspection on a wafer, consistent with embodiments of the present disclosure.

FIG. 3 is a diagram illustrating an effect of performing voltage contrast (VC) defect inspection on a wafer, consistent with embodiments of the present disclosure. The lower side of FIG. 3 shows a cross sectional view of a semiconductor structure that may be formed on wafer 201. The semiconductor structure may include substrate 300. Substrate 300 may include structures for forming semiconductor logic, such as metal oxide semiconductor field effect transistors (MOSFETs). For example, substrate 300 shown in FIG. 3 may include a PMOS and NMOS MOSFETs. NMOS and PMOS herein refer to types of MOSFETs.

Substrate 300 may be an intrinsic semiconductor. Substrate 300 may have a relatively low level of doping. Substrate 300 may include a silicon wafer. Substrate 300 may have an intrinsic region 320. Intrinsic region 320 may be formed of lightly doped p-type semiconductor (e.g., "P−"). Substrate 300 may include an oxide layer 310 that may be an exposed top surface of wafer 201. Oxide layer 310 may be formed of silicon oxide (SiO2).

Substrate 300 may include first through sixth plugs 331, 332, 333, 334, 335, and 336. The plugs may be configured to be connected to PN junctions. Substrate 300 may include a first well 321 and a second well 326. First well 321 and second well 326 may be spaced apart and separated by a partition 325. Partition 325 may be formed of a material different from that of intrinsic region 320, first well 321, and second well 326. First well 321 may be formed of p-type semiconductor that may have a doping concentration higher than that of intrinsic region 320. For example, first well 321 may include a P+ region. Second well 326 may be formed of n-type semiconductor (e.g., "N+").

Within each of first well 321 and second well 326, further doped regions may be formed. For example, first well 321 may include a first n-type semiconductor region 322 and a second n-type semiconductor region 324. First and second regions 322, 324 may include N+ regions. Second well 326 may include a first p-type semiconductor region 327 and a second p-type semiconductor region 329. First and second regions 327, 329 may include P+ regions. Thus, PN junctions may be formed between the various regions of differing semiconductor conductivity.

Voltage contrast (VC) defect inspection may be performed on substrate 300. A result of VC defect inspection may be represented by panel 340, as shown in the upper side of FIG. 3. Panel 340 may be an image acquired by e-beam inspection. An image acquirer included in EBI system 10 may be configured to acquire images by e-beam inspection and perform image processing. The image acquirer may be included in controller 109. VC defect inspection may involve observations based on the effect of applying a charge to the surface of a sample. Panel 340 may result from performing e-beam inspection of substrate 300. Panel 340 may be formed based on secondary electrons 301 generated from substrate 300 as a result of being impinged by a primary electron beam. An effect of applying a charge may be that additional current travels through substrate 300 according to the geometry or composition of structures making up substrate 300. Charges traveling through substrate 300 may affect the brightness (e.g., grey level) of imaged features. Based on the grey level of a feature being different from its surroundings, it may be possible to identify defects.

For example, structures that are well-connected to other features may appear differently in an image from those that are isolated. Charges may be able to flow through interconnected features, while charge may build up on the surface of features where no current leakage path exists. This may affect the resulting image of the features. As shown in FIG. 3, plug 331 is well-connected to underlying structures and its corresponding spot 341 appears relatively bright. However, plug 332 is not directly connected to first well 321, but instead abuts region 323. Region 323 may insulate plug 332 from other features. Thus, spot 342 corresponding to plug 332 may appear dimmer than spot 341. Accordingly, its grey level is lower. Further, plug 333 is disconnected from its underlying structures. Rather than being connected to second region 324 and first well 321, plug 333 is surrounded by oxide layer 310. Thus, spot 343 corresponding to plug 333 appears even dimmer than spots 341 and 342.

Furthermore, photo-electrical effects of semiconductor materials may affect VC defect inspection. For example, in VC defect inspection, the directionality of a PN-junction may affect the resulting grey level of a feature in an image. As shown in FIG. 3, plug 334 is connected to first region 327 that may be formed as a P+ region. Current may travel through a PN-junction formed by first region 327 and second well 326. There may be an energy barrier in a space charge region (e.g., a depletion region) in the PN-junction. Electrons may travel from substrate 300 and, due to charging, may flow through the PN-junction and reach the top of plug 334. Electrons may be emitted from plug 334 and reach a detector, thereby contributing to signal and thus causing the grey level of an imaged feature, e.g., spot 344, to increase.

On the other hand, for a PN-junction formed in the opposite direction, the built-in potential may be reversed, and a different effect may be encountered. For example, as shown in FIG. 3, plug 331 is connected to first region 322 that may be formed as an N+ region. Current may travel into a PN-junction formed by first region 322 and first well 321. Electrons may travel from substrate 300 into the PN-junction but may be unable to jump the energy barrier in the space charge region of the PN-junction. Therefore, no extra secondary electrons are generated from plug 331, and spot 341 may appear dimmer than spot 344.

Figure 4A:
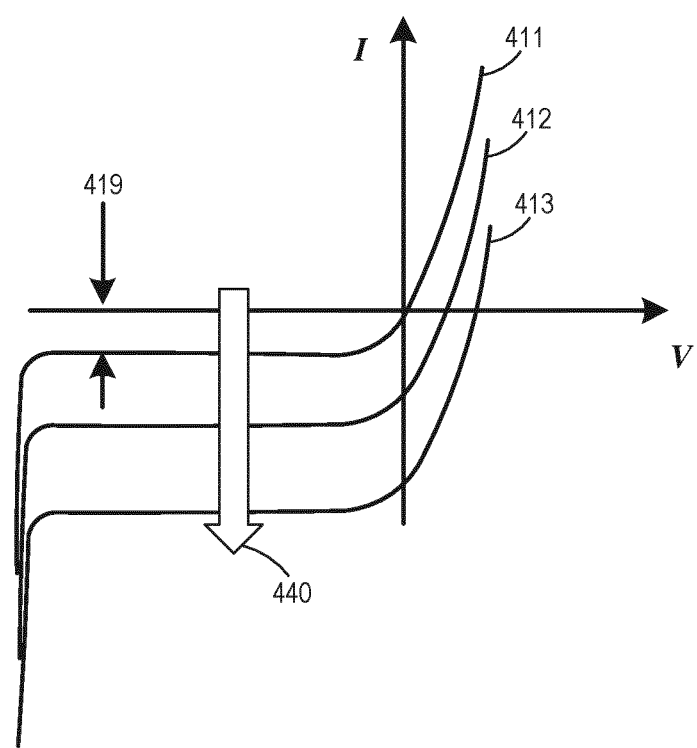
FIGS. 4A-4C illustrate an effect of applying secondary irradiation to a sample, consistent with embodiments of the present disclosure.
Figure 4C:
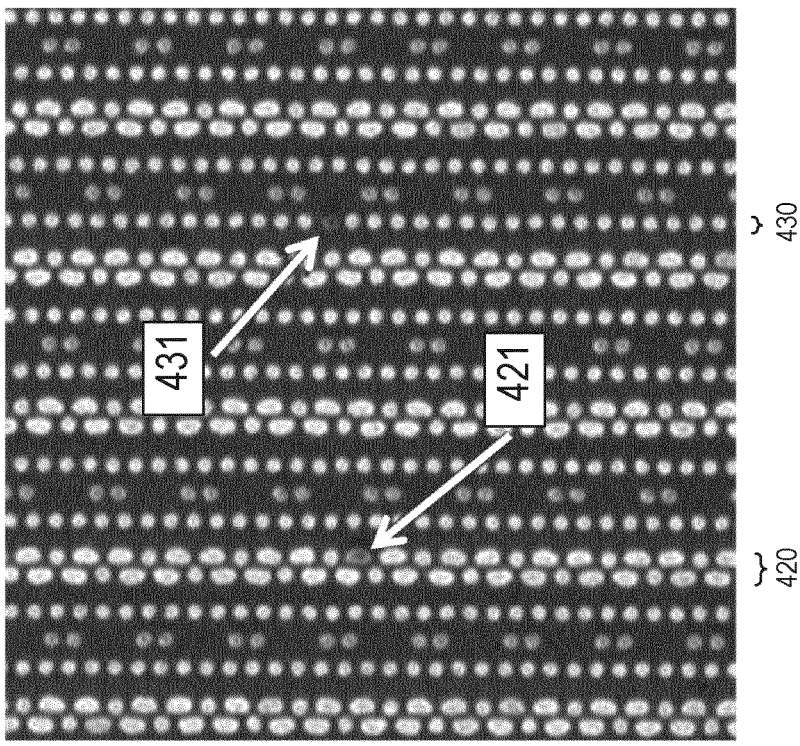
Figure 4B:
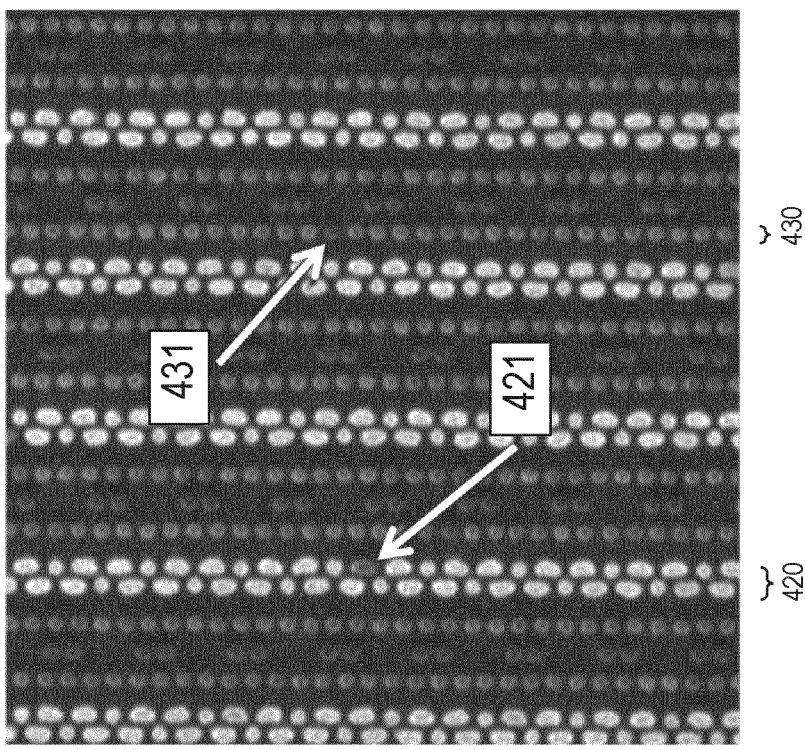

Reference is now made to FIGS. 4A-C, which illustrate an effect of applying secondary irradiation to a sample, consistent with embodiments of the present disclosure. A sample may be subject to secondary irradiation from a secondary source (e.g., from a laser). Secondary irradiation may cause structures on the sample to behave in a certain way. For example, the incidence of photons on the sample may cause electrons to be generated in the sample. Furthermore, the sample may be subject to the secondary irradiation alone or together with primary irradiation from a primary charged particle beam (e.g., from e-beam tool 100). Structures on a sample may be sensitive to photo-electrical effects. The structures may respond to application of primary and secondary irradiation such that defect detection may be enhanced when secondary irradiation is added. For example, structures may respond to primary irradiation in a certain way, but may respond in a different way when both primary and secondary irradiation is applied.

As shown, for example, in FIG. 4A, a semiconductor structure, such as a diode, may exhibit characteristic behavior when irradiation is applied thereto. Curve 411 demonstrates I-V behavior of a diode according to a reverse bias mode. Application of secondary irradiation on a sample may cause charge to be generated in a semiconductor structure included in the sample. Furthermore, depending on a parameter of the secondary irradiation, the characteristic behavior may be altered. For example, as illumination light power of the secondary irradiation increases, which may result in a different charge being present at the sample, the curve representing I-V behavior of the diode may shift down, e.g., due to the effect of the change in charge or some other effect related to the secondary irradiation, as shown by arrow 440. Curve 412 is an example of behavior of a diode when secondary irradiation of a greater power than that of curve 411 is applied. Power used in curve 413 is greater than that in curve 412, and so on. Curves 411-413 may represent photocurrent in the diode. Region 419 may represent a dark current region, for example.

FIG. 4B shows an image of a sample having a plurality of plugs. An image of the sample may be acquired by e-beam imaging using EBI system 10. In FIG. 4B, the image may be acquired by scanning a primary beam of e-beam tool 100 across a region of the sample, thereby forming an image of a portion of the sample in the FOV of e-beam tool 100. The image of FIG. 4B may be formed without applying secondary irradiation.

In FIG. 4B, a plug 421 may be included in a row 420. Plug 421 may have a grey level that is determined to be a certain value. Other plugs in row 420 except for plug 421 may have substantially the same grey level. Plug 421 may be defective, and its grey level may be different from that of other plugs in its row. Plug 421 may have a grey level that is much less than that of other plugs in row 420. For example, plug 421 may have a grey level that is determined to be 46% that of its surrounding plugs. In other words, the grey level of plug 421 may be determined to have dropped by 54%.

Grey level may be measured in arbitrary units. Grey level of the plugs in row 420 may be determined to be an average value. Grey level of the plugs in row 420 may be determined to be, for example, 100 AU (arbitrary units). Grey level of plug 421 may be determined to be 46 AU. Based on this, it may be determined that the grey level of plug 421 is different from that of other plugs in row 420 by 54%.

As shown in FIG. 4B, another row 430 may also appear in the acquired image. Row 430 includes plug 431. Plug 431 may be defective, and its grey level may be slightly less than that of other plugs in its row. For example, plug 431 may have a grey level that is determined to be 70% that of its neighboring plugs. In other words, the grey level of plug 431 may be determined to have dropped by 30%.

Determining that a feature is defective may involve a comparison of a determined parameter of the feature to a parameter indicative of other features. A controller, such as controller 109 that may be included in EBI system 10, may be configured to determine defects. Controller 109 may include an image processor. The image processor may be configured to extract features from an acquired image. The image processor may separate an image into different regions containing different groups of features. For example, controller 109 may be configured to process the image of FIG. 4B to determine that the image includes multiple rows, including row 420, determine an average grey level of row 420, and determine the grey level of individual features in row 420. A grey level of a group of features, for example, two consecutive plugs, may be determined. Controller 109 may be configured to determine that a feature, such as plug 421, is defective when its grey level is different from the average of row 420 by a predetermined amount, and then issue an alert. The predetermined amount may be a defect detection threshold. In some embodiments, instead of an average of the whole row of row 420, the grey level of plug 421 may be compared to that of immediately neighboring plugs.

In some embodiments, to reduce the influence of noise, it may be desirable to increase a defect detection threshold. For example, if the defect detection threshold is too low, it may result in a large number of false positives (e.g., identifying features as defective that are not actually defective). Therefore, a relatively high defect detection threshold of, e.g., 50%, may be set.

Controller 109 may be configured to determine that a feature is defective only when the detected difference in grey level of the feature is 50% or more. In this case, plug 431 would not be identified as defective. Only plug 421 would be correctly identified as defective. Thus, there may be a misdetection with respect to plug 431, or other features.

FIG. 4C shows an image of the sample that may have been acquired by e-beam imaging using EBI system 10 with secondary irradiation. In the case of FIG. 4C, an image of the sample may be acquired by scanning a primary beam of e-beam tool 100 across a region of the sample while applying secondary irradiation to the same region. Features on the sample may be affected by the secondary irradiation and may generate photocurrent, for example based on the photoelectric effect demonstrated by FIG. 4A. Generation of photocurrent in irradiated features may cause imaging effects by e-beam inspection to be amplified. For example, for properly formed transistors, the grey levels of imaged features may increase. For defective transistors, the grey level of imaged features may be lower compared to those that are properly formed. Depending on the type of structure, the extent of the photo-electric effect may be different. Applying secondary irradiation may cause the inspection sensitivity of N-open defects to be significantly increased.

As shown in FIG. 4C, secondary irradiation may be applied to a sample, and an image may be formed in which plugs generally have a higher grey level than those of FIG. 4B, where no secondary irradiation is applied. Most plugs may be properly formed, and thus, most plugs may appear brighter. However, plug 421 may be defective and may have a grey level that is less than other plugs in row 420. In FIG. 4C, it may be determined that plug 421 has a grey level that is 50% that of its surrounding plugs. In other words, the grey level of plug 421 may be determined to have dropped by 50%. Furthermore, plug 431 may be defective, and its grey level may be determined to be 50% that of its neighboring plugs. In other words, the grey level of plug 431 may be determined to have dropped by 50%.

Controller 109 may be configured to determine that features are defective by the same algorithm as that discussed above, that is, that the defected difference in grey level of the feature is 50% or more. In the case of FIG. 4C, it may be determined that both plug 421 and plug 431 are defective. Thus, a misdetection with respect to plug 431 may be avoided.

FIGS. 4A-4C may demonstrate an influence of a photo-electric effect on e-beam imaging. Using the photo-electric effect by applying secondary irradiation may allow more defects to be detected and may enhance defect detection sensitivity. The mechanism of FIGS. 4A-4C may also be referred to as active charge control (ACC). While this technique may allow some additional defects to be identified, it may not always be the case that applying secondary irradiation enhances defect detection sensitivity. For example, different structures may respond differently to secondary irradiation, and this may complicate inspection. Furthermore, the extent of the photo-electric effect may depend a parameter of the secondary irradiation, such as source power, and photo-electric effects may not result in observable changes except at certain levels of the parameter.

Figure 5A:
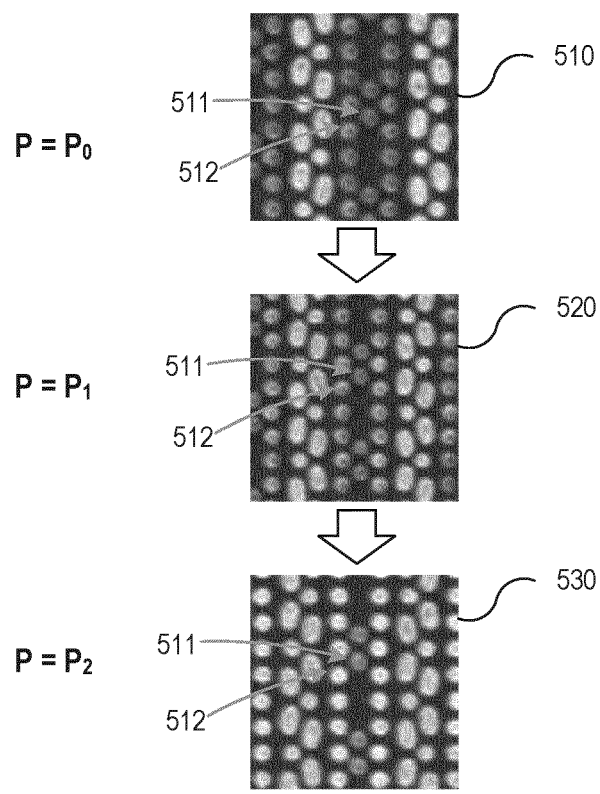
FIG. 5A shows images of a sample that may have been acquired by e-beam imaging using EBI system 10 with or without secondary irradiation, consistent with embodiments of the present disclosure.

FIG. 5A shows images of a sample that may have been acquired by e-beam imaging using EBI system 10 with or without secondary irradiation, consistent with embodiments of the present disclosure. The sample may include SRAM-WCMP structures. Images may be acquired by SEM imaging. A first image 510 may correspond to imaging conditions where no secondary irradiation is applied. For example, a parameter P of the secondary irradiation may be P0, which may be zero. First image 510 may show a first plug 511 and a second plug 512. Grey levels of first plug 511 and second plug 512 in first image 510 may be substantially equal, and thus, first plug 511 and second plug 512 may be indistinguishable on the basis of grey level.

A second image 520, as shown in FIG. 5A, may show the same region of the sample as that shown in first image 510, but under different imaging conditions. Second image 520 may correspond to imaging conditions where a first level of secondary irradiation is applied. For example, parameter P of the secondary irradiation may be P1 in image 520, and P1 may be greater than P0. Despite secondary irradiation having been applied, grey levels of first plug 511 and second plug 512 in second image 520 may be substantially equal, and thus, first plug 511 and second plug 512 may still be indistinguishable on the basis of grey level. Secondary irradiation may be applied in a region where first plug 511 and second plug 512 respond to the secondary irradiation in substantially the same way.

Defect inspection based on grey level variation between a state where secondary irradiation is applied and a state where secondary irradiation is not applied may face issues, such as the following. Even though grey levels of features may change when secondary irradiation is applied compared to a state where there is no secondary irradiation, the features under inspection may respond equally to the secondary irradiation. Therefore, although imaging effects may be amplified (e.g., by grey levels of features globally increasing overall), the application of secondary irradiation may not actually enhance detection sensitivity. Features that actually have different characteristics (e.g., being defective or not) may appear the same in some instances even when secondary irradiation is applied.

However, when a parameter of the secondary irradiation continues to be varied, differences in characteristics of imaged features may become evident. As shown in FIG. 5A, a third image 530 may show the same region of the sample as that shown in first image 510 and second image 520, but under different imaging conditions. Third image 530 may correspond to imaging conditions where a second level of secondary irradiation is applied. For example, parameter P of the secondary irradiation may be P2 in image 530, and P2 may be greater than P1. The secondary irradiation may be applied at a level where different responses begin to manifest themselves in the imaged features. For example, grey levels of first plug 511 and second plug 512 in third image 530 may be different. The difference between grey levels of first plug 511 and second plug 512 may surpass a threshold, and thus, it may be determined that there is a difference between first plug 511 and second plug 512. The secondary source, having parameter P varied over the course of acquiring multiple images, can be said to have been evolved. The parameter P may be power of the secondary source.

Figure 5B:
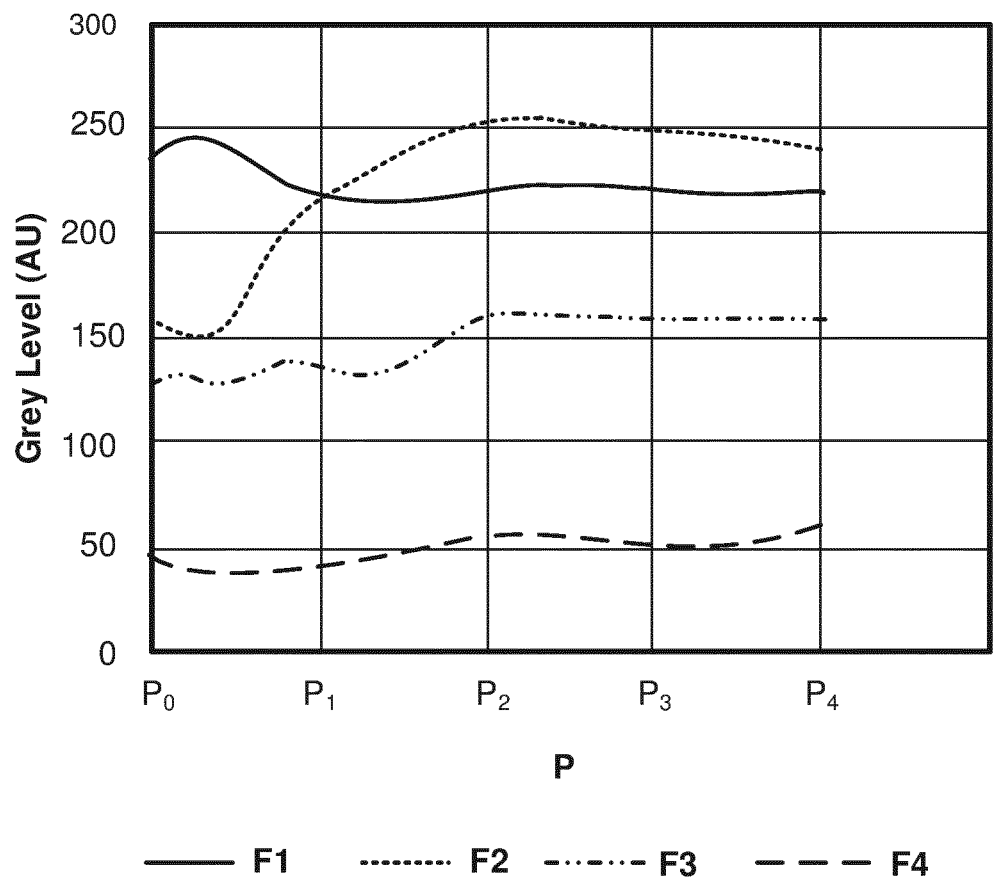
FIG. 5B shows grey level variation of imaged features at different levels of parameter P, consistent with embodiments of the present disclosure.

FIG. 5B shows grey level variation of imaged features at different levels of parameter P, consistent with embodiments of the present disclosure. FIG. 5B may illustrate a progression of evolving a secondary source over time. A plurality of images may be acquired at different imaging conditions. Parameter P may be varied over time, and images may be acquired at different values of parameter P. In each of the images, image processing may be performed. Features may be extracted and analyzed. A parameter of a feature, such as its grey level, may be determined from the image. The grey level may change with variation in parameter P of the secondary source. It may be useful to track the grey level variation as parameter P varies. From this, a curve representing a feature's response to secondary irradiation may be generated.

FIG. 5B shows a plot of curves for different features. For example, first through fourth features F1-F4 are shown. The features may respond differently to secondary irradiation. This may be due to differing materials and structures making up the features. First through fourth features F1-F4 may exhibit characteristic behavior indicative of their properties when secondary irradiation is applied, and this may manifest itself in curve data of the respective features. In some embodiments, it may be determined, for example, that first feature F1 corresponds to a PMOS drain, second feature F2 corresponds to an NMOS drain, third feature F3 corresponds to a gate, and fourth feature F4 corresponds to background. A PMOS may have terminals, including a source and drain, that may be formed as a P+ doped region with a N− doped well. An NMOS may have terminals, including a source and drain, that may be formed as a N+ doped region within a P− doped well.

Curves may be useful in acquiring additional information about features under inspection. For example, based on curve data, it may be determined that a feature is a particular kind of structure. In FIG. 5B, second feature F2 exhibits a trend of rapid increase in grey level in an initial region (e.g., between P0 and P2) and a leveling off in further regions (e.g., between P2 and P4). This type of behavior may be characteristic for a terminal in an NMOS, e.g., an NMOS drain. It may be determined that first plug 511 is an NMOS drain and that second plug 512 is another type of structure based on curve data.

Curve data may include a variety of forms. For example, a feature may respond uniformly to added laser power. Thus, a curve may be generated that is substantially flat. In some embodiments, a feature may respond positively to added laser power. That is, as laser power is increased, grey level variation may also increase. An example of such a feature may be an NMOS drain. In some embodiments, a feature may respond negatively to added laser power. That is, as laser power is increased, grey level variation may decrease. An example of such a feature may be a PMOS drain. All of such trends may be useful information that may be applied in determining characteristics of a feature. Furthermore, determination of whether a feature is defective or not may be based on what type of feature it is.

Figure 6:
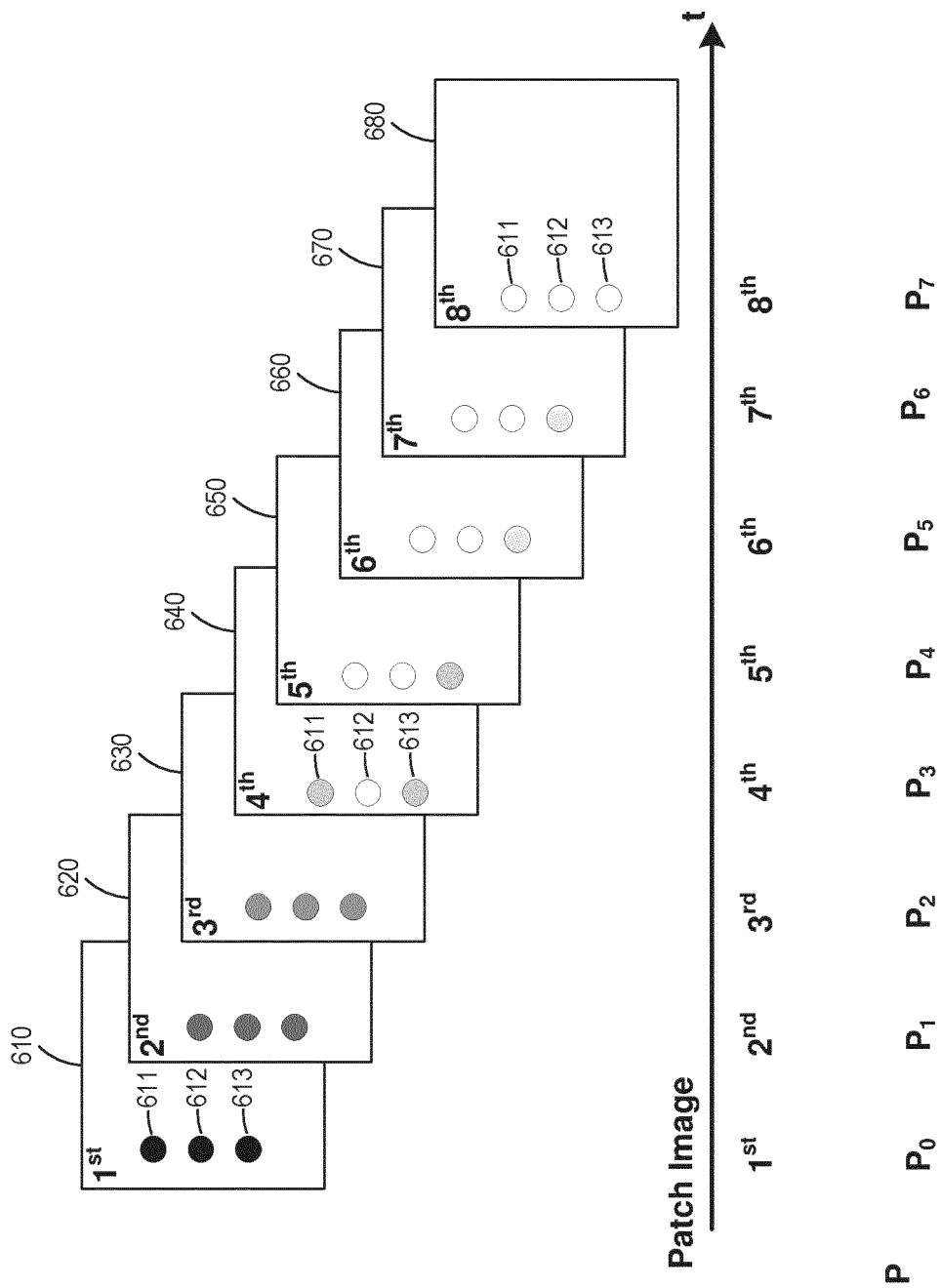
FIG. 6 illustrates a plurality of images acquired at differing levels of parameter P of a secondary source, consistent with embodiments of the present disclosure.

FIG. 6 illustrates a plurality of images acquired at differing levels of parameter P of a secondary source, consistent with embodiments of the present disclosure. Images may be acquired using e-beam inspection. Secondary irradiation may be applied by a secondary source. Parameter P of the secondary source may be varied, and images may be acquired at different levels of parameter P. Images may be acquired sequentially. For example, a first image 610 may be acquired when a value of parameter P is P0. P0 may be equal to 0, and thus, first image 610 may be acquired when no secondary irradiation is applied. Next, a second image 620 may be acquired when a value of parameter P is P1. P1 may be greater than P0. A third image 630 may be acquired when a value of parameter P is P2, and so on. Images 610, 620, 630, 640, 650, 660, 670, and 680 may be patch images. A patch image may be a piece of a larger image. A patch image may include a cropped portion of a larger image, such as a portion that includes a defect of interest. An image may be split into several patch images. In some embodiments, a patch image may be generated from partial pixel data. For example, patch image processing may be used in which a patch image is generated before a full scan of a region of interest of a sample is completed. Images may be acquired in order with image index increasing with an increase in value of parameter P.

In some embodiments, images may be acquired in reverse order. For example, images may be acquired with image index increasing with a decrease in value of parameter P. Furthermore, in some embodiments, images may be acquired in no particular order corresponding to variation in parameter P. For example, P2 may be less than P1, and P3 may be greater than P2. Secondary irradiation may be configured to have low time-dependence or hysteresis effects. Therefore, secondary irradiation generated by the secondary source may be varied arbitrarily.

In some embodiments, a range of parameter P may be determined in advance. A method of evolving a secondary source may include sweeping through a plurality of points where values of parameter P are varied within the range. The range may be configured to include a point where it is determined that a maximum difference between similar features may be manifest. For example, the range may be configured to include a point Py, which shall be discussed below with reference to FIG. 8B. In some embodiments, the range may be configured to include the point Py along with a predetermined buffer on either side of Py. In some embodiments, the point Py may be determined based on a prediction. For example, it may be determined that a sample includes SRAM-WCMP devices, and thus, it may be effective to include the point Py in the range where it may be expected that grey level variation between NMOS terminal plugs may be maximized.

Figure 7:
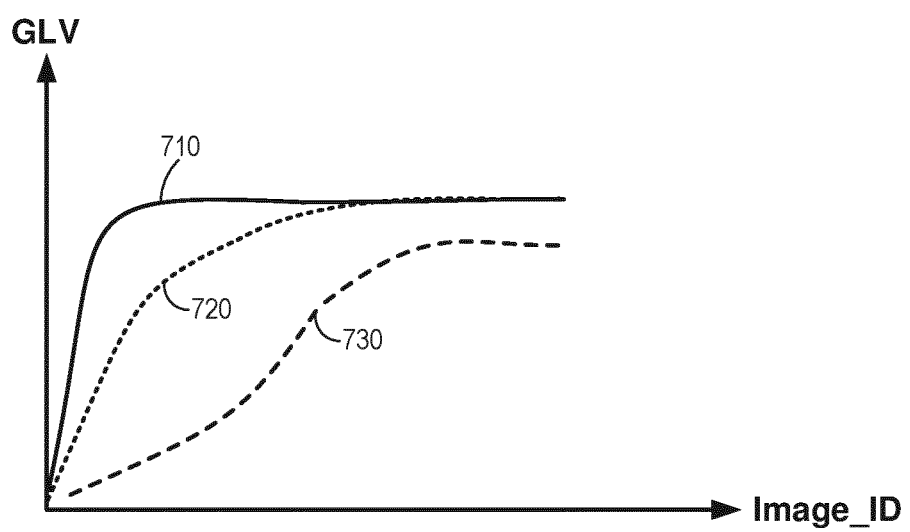
FIG. 7 illustrates behavior of a feature varying with image ID, consistent with embodiments of the present disclosure.

FIG. 7 illustrates behavior of a feature varying with image ID, consistent with embodiments of the present disclosure. FIG. 7 shows a graph with image ID on the x-axis and grey level variation (GLV) on the y-axis. Progression in image ID may correspond with increase in parameter P of a secondary source, as discussed above. In the graph of FIG. 7, first through third curves 710, 720, and 730 are shown. Curve data of a feature may be prepared in advance. For example, individual data points representing grey level of a known structure may be extracted from previously acquired images.

Curve 720 may correspond to normal behavior of a known structure. Curve 720 may correspond to an NMOS drain. Curve 720 may be prepared by analyzing a predetermined number of NMOS drains and averaging, for example. Thus, it may be expected that a normal NMOS drain should exhibit behavior similar to that of curve 720 in newly imaged samples. Deviation from curve 720 may indicate that an imaged feature is a different structure or is defective.

Furthermore, certain types of defects may exhibit characteristic behavior when image ID (e.g., parameter P of a secondary source) is varied. As shown in FIG. 7, curve 710 and curve 730 are also provided. Curves 710 and 730 may also correspond to an NMOS drain but may have other differences from a normal NMOS drain. For example, curves 710 and 730 may correspond to defects. Curve 710 may correspond to a leak defect. Curve 730 may correspond to a high-R defect. Curve data of various types of defects may be prepared in advance and may be determined based on averaging a predetermined number of known samples, for example. Curves associated with defect type may also be associated with structure type.

Figure 8A:
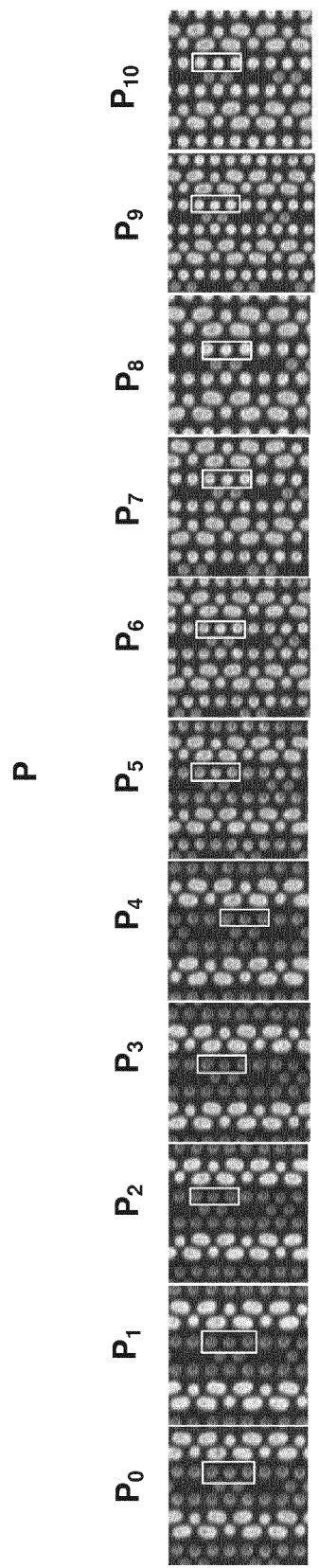
FIGS. 8A and 8B show images and curve data of a sample that may have been acquired by e-beam imaging with evolution of secondary irradiation, consistent with embodiments of the present disclosure.
Figure 8B:
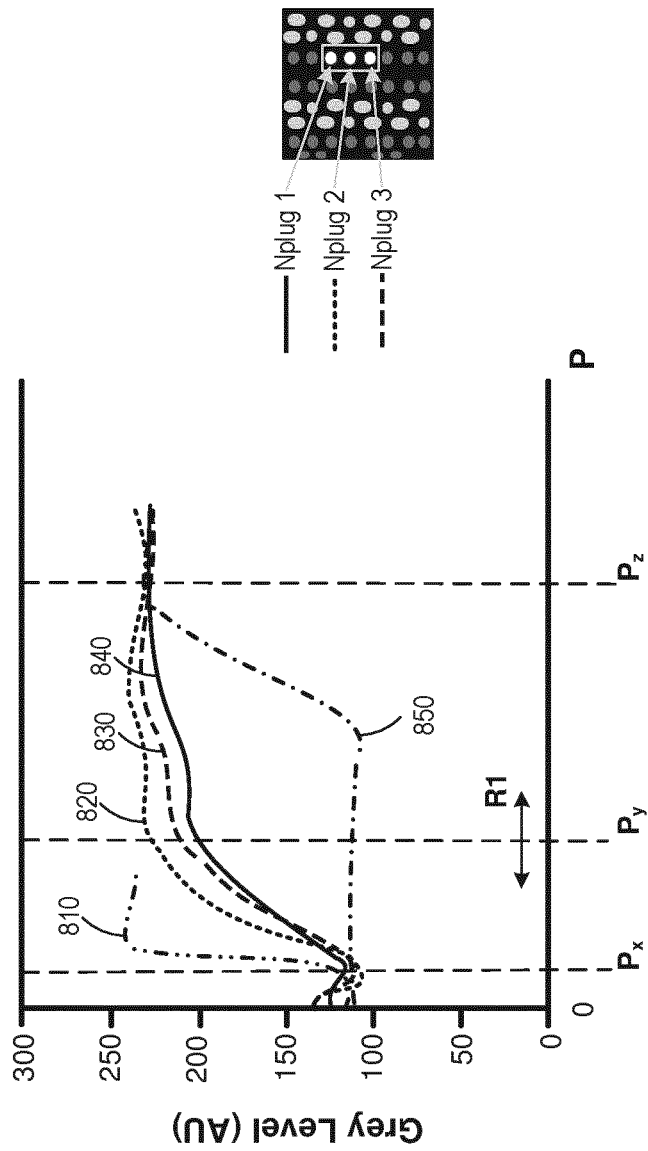

FIGS. 8A and 8B show images and curve data of a sample that may have been acquired by e-beam imaging with evolution of secondary irradiation, consistent with embodiments of the present disclosure. FIG. 8A may represent SEM images of a sample that may include SRAM-WCMP structures. The same three plugs, e.g., Nplug1, Nplug2, and Nplug3, are highlighted in the various images of FIG. 8A.

FIG. 8B includes a graph showing the dependence of grey level on parameter P of secondary irradiation for a plurality of features. The grey level may vary depending on parameter P depending on the character of the feature. For example, a curve 810 may correspond to a leakage defect. A curve 850 may correspond to a high-R defect. Curves 820, 830, and 840 may correspond to plugs that are not defective (e.g., plugs Nplug1, Nplug2, and Nplug3), but are nonetheless distinct from one another. Nplug1, Nplug2, and Nplug3 may respond differently to variation in parameter P of secondary irradiation. For example, Nplug1, Nplug2, and Nplug3 may respond differently to laser power evolution due to different compositional makeup.

As shown in FIG. 8B, some features may exhibit the same response at certain points and may exhibit different responses at certain points. For example, curves 820, 830, and 840 may converge at a point where P=Px and at a point where P=Pz. In a comparative method, ACC may be applied at points where distinctions between features may be lost. For example, imaging of a sample may be conducted at a point P=Px, and it may be determined that plugs Nplug1, Nplug2, and Nplug3 are identical. Imaging may also be conducted at a point where P=0, for comparison. Grey level variation in imaged features may be analyzed based on an image acquired at P=0 and at P=Px. However, imaging the sample even while applying secondary irradiation (e.g., by ACC), may not yield any additional information compared to that gathered from the image acquired at P=0. Therefore, a misdetection of defects may occur, or other differences between features may be overlooked.

In contrast to the comparative method, evolution of secondary irradiation may avoid such misdetection and may enable a detection method to capture data indicative of differences in seemingly identical features. For example, as shown in FIG. 8B, at a point where P=Py, grey level difference between curves 820, 830, and 840 may reach a maximum. Grey level differences from known defects, such as curve 850 representing a high-R defect, may also be pronounced at this point. An image acquired at P=Py may be useful in visualizing differences between features, and analysis of different features may be easily performed. Evolution of secondary irradiation may enable a determination of an optimal point for acquiring and analyzing a SEM image. Furthermore, the additional information derived from curve data may be useful for other purposes. Sensitivity of detection may be enhanced by providing such additional information.

In some embodiments, secondary irradiation may be evolved over a range of parameter P. The range may be determined based on a point where differences between curves may be maximized. For example, FIG. 8B shows a range R1 centered around the point P=Py. The range may extend a predetermined amount from the center point. It may be determined to perform inspection while evolving secondary irradiation over range R1.

Deviation of a curve from a standard curve may indicate differences in an imaged feature's structure, composition, or other characteristic. Analysis may be performed to determine similitude between an imaged feature and standard curves stored in a database. Standard curves may be provided for features that are commonly encountered for a particular type of inspection. For example, a SRAM-WCMP standard feature database may be loaded prior to inspection of a sample. Furthermore, analysis may be performed on curve data to determine how much the imaged feature deviates from the standard curve. For example, root mean square (RMS) error from a standard curve may be determined. Other measures of deviation, such as offset, skew, etc., may be determined. Analysis based on standard curves may indicate that while an imaged feature may be similar to a standard curve, there may be structural or compositional irregularities that warrant further investigation. Analysis may also indicate that an imaged feature is defective. Analysis may also be used to classify a feature as a particular kind of structure, such as a terminal of a PMOS or NMOS, a gate, a body, etc. Analysis may be used to classify a defect as a particular type of defect, such as short, open, leak, high-R, etc.

Analysis based on evolution of secondary irradiation may be used to construct a map. For example, resistance mapping and compositional mapping may be performed. Mapping may be useful to identify systematic, rather than local characteristics of a sample. Mapping may be used to determine a wafer signature. The wafer signature may indicate that system-level irregularities are present, such as manufacturing process irregularities. Analysis based on the wafer signature may be used to adjust processing in a batch. A method of mapping may be performed prior to or after a probing process.

In some embodiments, parameter P of secondary irradiation may be power of the secondary source. For example, parameter P may correspond to the power at which a laser diode is operated. In some embodiments, parameter P may correspond to wavelength of the secondary source. For example, parameter P may correspond to the wavelength of light emitted by a laser diode.

A secondary source may be configured to produce secondary irradiation at a plurality of wavelengths. For example, secondary source 200 may include a laser diode module. The laser diode module may include a plurality of laser diodes, each configured to emit a laser at a different wavelength. EBI system 10 may be configured to acquire a plurality of images of a sample while secondary source 200 varies the wavelength of its laser output. One laser diode may be configured to emit at one wavelength at a time while e-beam imaging is performed.

Figure 9A:
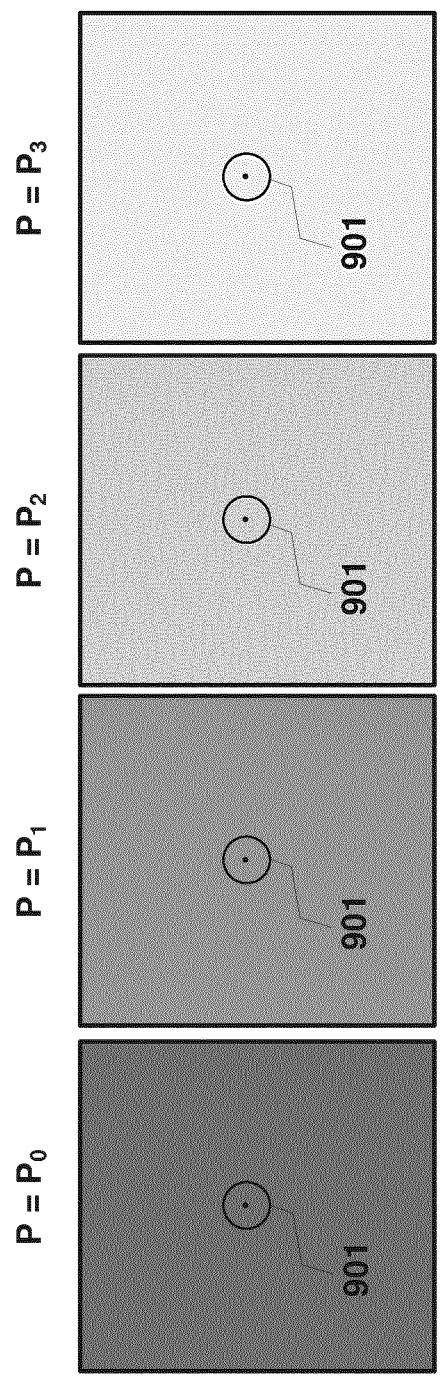
FIG. 9A shows images of a sample that may have been acquired by e-beam imaging with evolution of secondary irradiation, consistent with embodiments of the present disclosure.

FIG. 9A shows images of a sample that may have been acquired by e-beam imaging with evolution of secondary irradiation, consistent with embodiments of the present disclosure. FIG. 9A may represent SEM images of a sample that may include 3D NAND (floating gate) structures. Evolution of secondary irradiation may be performed by varying, for example, the wavelength of the secondary irradiation applied by a secondary source. Voltage contrast imaging by a SEM may reveal the presence of defects, such as those highlighted in FIG. 9A by an indicator 901. As shown in the images of FIG. 9A, P=P0 may represent a case where secondary irradiation is not applied. P1 may be a first wavelength. P2 may be a second wavelength, and P2 may be less than P1. That is, higher frequency secondary irradiation may be applied in the case of P=P2 than in the case of P=P1. P3 may be a third wavelength, and P3 may be less than P1 or P2. That is, higher frequency secondary irradiation may be applied in the case of P=P3 than in the case of P=P1 or P=P2. Power of the secondary irradiation may be held constant. In some embodiments, however, power of the secondary irradiation may also be varied along with other parameters of the secondary irradiation.

Different types of defects may respond differently to laser wavelength variation. Some defects may be more easily detected when a certain value of parameter P of secondary irradiation is used. Evolution of secondary irradiation through a variety of laser wavelengths may reveal that a certain wavelength is well-suited for detecting a particular type of defect. Sensitivity of defect detection of weak defects may be enhanced by evolution of secondary irradiation.

Figure 9B:
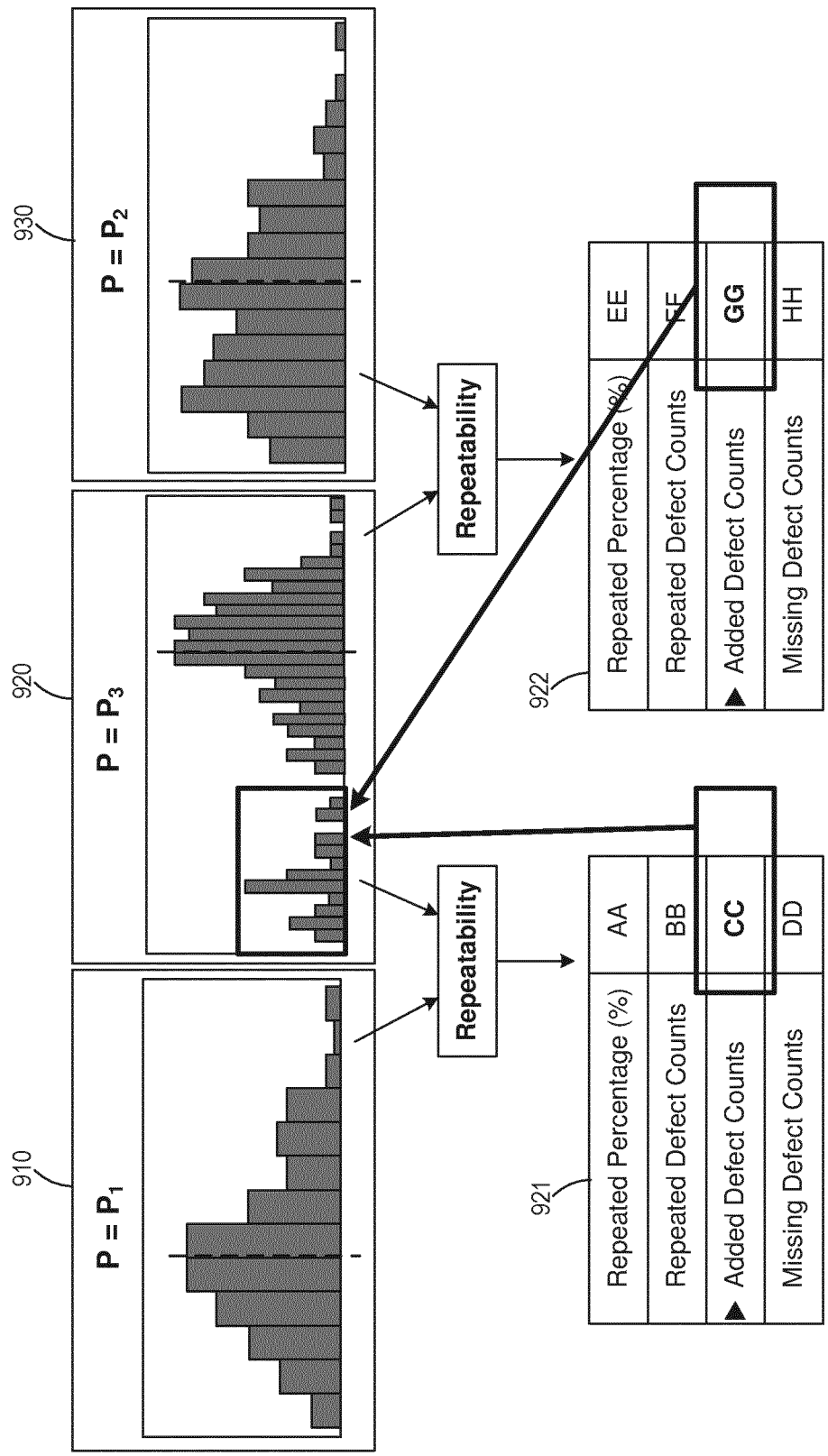
FIG. 9B shows distributions of detected defects using different values of parameter P of secondary irradiation, consistent with embodiments of the present disclosure.

FIG. 9B shows distributions of detected defects using different values of parameter P of secondary irradiation, consistent with embodiments of the present disclosure. Plot 910 shows a distribution of defects at P=P1. Plot 920 shows a distribution of defects at P=P3. Plot 930 shows a distribution of defects at P=P2. Defect detection analysis may be performed based on e-beam inspection while secondary irradiation is applied. Results of defect detection analysis may reveal an optimal value of parameter P at which defect detection efficiency is maximized. For example, it may be determined that plot 920 represents the optimal conditions for performing defect detection of the sample undergoing inspection.

Defect detection results may be compared to one another and further analysis may be performed. As shown in FIG. 9B, a first table 921 and a second table 922 may be generated based on results of defect detection analysis. A first defect detection analysis may be conducted for the defect distribution corresponding to P=P1, and a second defect detection analysis may be conducted for the defect distribution corresponding to P=P3. First table 921 may be generated based on a comparison of the first and second defect detection analyses. The comparison may include repeatability analysis. Repeatability analysis may involve comparing the defects detected in the defect distribution of P=P1, and those detected in the defect distribution of P=P3. For example, it may be determined that a proportion, e.g., AA % of defects overlap. This may also be expressed as a raw count, e.g., a number BB of defects may overlap between the defect distribution of P=P1 and the defect distribution of P=P3. Furthermore, it may be determined that CC extra defects are counted in the distribution of P=P3 as compared to the distribution of P=P1.

Similarly, second table 922 may be generated based on a comparison of a third defect detection analysis and the second defect detection analysis. The comparison may include a repeatability analysis, as mentioned above. The repeatability analysis may involve comparing the defects detected in the defect distribution of P=P2, and those detected in the defect distribution of P=P3. For example, it may be determined that EE % of defects overlap. This may also be expressed as a raw count, e.g., a number FF of defects may overlap between the defect distribution of P=P2 and the defect distribution of P=P3. Furthermore, it may be determined that GG extra defects are counted in the distribution of P=P3. as compared to the distribution of P=P2.

A defect distribution at a certain value of parameter P may enhance robustness of defect detection. For example, as shown in FIG. 9B, plot 920 shows a distribution of defects having a broader range and greater diversity than that of plot 910 or plot 930. Furthermore, plot 920 includes a subpopulation of defects in a region spaced apart from the median of the distribution. The extra counts of defects, for example those discussed above with reference to tables 921 and 922, may be attributed to defects captured in this region.

In some embodiments, a method of evolving a source may be provided. The source may include a primary source configured to generate primary irradiation that includes a primary beam of a charged particle beam apparatus, and the source may include a secondary source configured to generate secondary irradiation. The secondary irradiation may include the power or wavelength of a laser diode.

Figure 10:
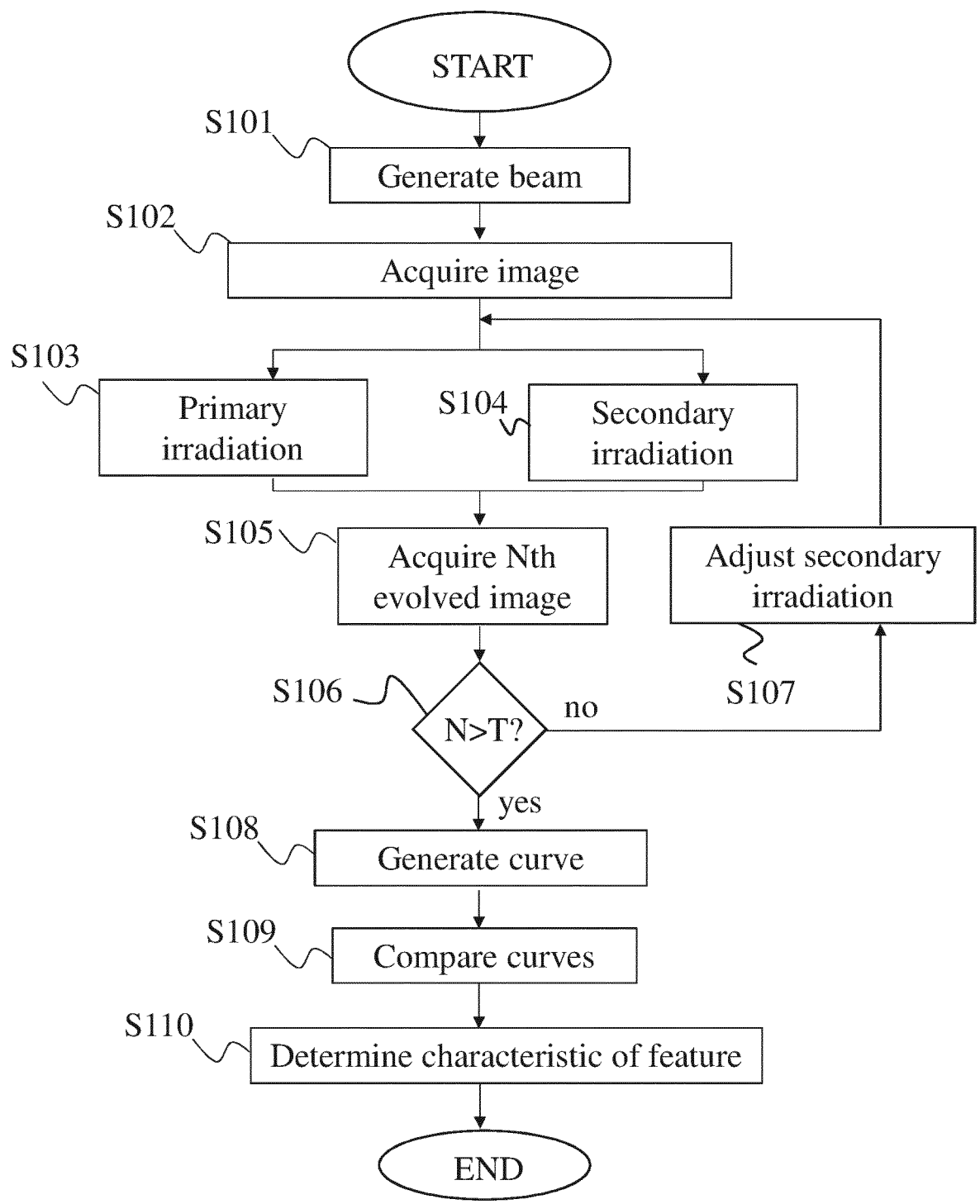
FIG. 10 is a flowchart illustrating a method of evolving a source consistent with embodiments of the present disclosure.

FIG. 10 illustrates a method of evolving a source consistent with embodiments of the present disclosure. The method of FIG. 10 may be executed by a controller, such as controller 109. Controller 109 may issue instructions to components of a charged particle beam system, for example, or other system to accomplish certain functions. Controller 109 may include circuitry configured to perform various functions. Upon starting of the routine of FIG. 10, the method may proceed to step S101. Step S101 may include forming a beam. The beam may include a primary charged particle beam that may be generated by a charged particle beam apparatus. Step S101 may include generating primary beam 241 by electron beam tool 100.

Primary beam 241 may be scanned across a region of a sample, such as wafer 201. There may be a region of interest on wafer 201 that may be a subject of inspection. Step S101 may include scanning a first location on the sample. The first location may correspond to the location of a feature. The first location may correspond to a first pixel in an image generated by the charged particle beam apparatus. Step S101 may also include scanning a second location on the sample, and so on. The second location may correspond to a second pixel.

Next, the method may proceed to step S102. Step S102 may include acquiring an image. The image may include a plurality of pixels. An image acquired in step S102 may include a base image. The base image may be one in which an image of the sample is acquired using only a primary source (e.g., primary beam 241 of electron beam tool 100). The base image may be one in which an image of the sample is acquired while secondary irradiation is not being applied to the sample. Step S102 may include acquiring an image by e-beam inspection. Step S102 may include voltage contrast imaging. Step S102 may include image processing. Image processing may include extracting features, determining regions in an image, and determining parameters of imaged features. For example, controller 109 may be configured to process the image acquired in step S102 to determine that the image includes multiple rows of plugs, determine an average grey level of the row, and determine the grey level of individual features in the row. The grey level of the feature may include the grey level of one or more pixels.

The method may then proceed to steps S103 and step S104. Step S103 may include generating primary irradiation, and step S104 may include generating secondary irradiation. Steps S103 and S104 may be performed simultaneously, or may be performed separately, or may overlap (e.g., step S104 performed before and during step S103). Generating primary irradiation may include, for example, generating primary beam 241 by electron beam tool 100 as shown in FIG. 2. Generating secondary irradiation may include, for example, generating secondary irradiating beam 242 by secondary source 200 as shown in FIG. 2. Secondary irradiation may be applied to an imaging region on a sample, and the imaging region may be the same as the region that primary beam 241 is projected onto. Due to an effect such as the photo-electric effect, secondary irradiation on the sample may cause features in the imaging region to emit secondary particles in a different manner from a case in which no secondary irradiation is applied. The secondary particles may be detected by a detector.

In step S105, an Nth evolved image (where N is a whole number) may be acquired. For example, a first evolved image, a second evolved image, or a third evolved image may be acquired, and so on. The image may be based on a signal generated in the detector in response to receiving secondary particles. Because secondary irradiation is applied, the Nth evolved image may be different from the image acquired in step S102. N may be a variable that represents an index. When the method of FIG. 10 begins, N may be initiated at 1, and may be incremented each time that step S105 is performed. N may correspond to a number of evolved images acquired thus far. Step S105 may include acquiring a patch image.

Next, the method may proceed to step S106. Step S106 may include determining whether N is greater than a threshold T. Threshold T may be a set parameter, such as a number of images to be obtained. Step S106 may include reading a value of N stored in memory. Threshold T may be set in advance. Threshold T may be determined based on a number of data points determined to be sufficient for forming a curve. In some embodiments, T may be 2. That is, a method of evolution may include acquiring a base image, and then acquiring at least two images where secondary irradiation is applied. In some embodiments, N may be determined based on an available amount of time for performing imaging. In the example of FIG. 6, threshold T may be set to 6, and a method of imaging may proceed until image 680 is acquired, at which point N may reach a value of 7. In some embodiments, imaging may continue past acquiring an 8th patch image as shown in FIG. 6.

In step S106, if it is determined that N is less than or equal to T, the method may proceed to step S107. Step S107 may include adjusting the secondary irradiation. Step S107 may include varying parameter P of the secondary irradiation. Step S107 may include varying the power of secondary source 200. Step S107 may include varying the wavelength of secondary irradiation generated by secondary source 200.

From step S107, the method may return to steps S103 and S104. In step S104, secondary irradiation may be applied to the same sample at a different value of parameter P than that performed earlier. Thus, the secondary source may have been evolved. Then, in step S105, an Nth evolved image may be acquired. The image acquired may be different from that acquired previously. Step S105 may include incrementing a value of N.

Returning to step S106, it may again be determined whether N is greater than T. If N is greater than T, the method may proceed to step S108. In step S108, a curve may be generated. The curve may be based on data from multiple acquired images. Features in the acquired images may be analyzed. For example, grey level variation of a feature may be tracked over the course of the multiple images being acquired. The curve may indicate a trend of grey level variation with respect to varying power level or wavelength of secondary irradiation, for example.

Next, in step S109, curves may be compared. A curve generated in step S108 may be compared to curves previously generated. Other curves may include curves stored in a database. In some embodiments, a plurality of features may be identified in each image, and a curve for each of the plurality of features may be generated. The curves of each of the features may be compared against one another.

Next, the method may proceed to step S110. Step S110 may include determining a characteristic of a feature. Step S110 may include determining a characteristic of a feature based on a curve that may have been generated in step S108. Step S110 may include determining that a feature is a defect. Step S110 may include determining that a feature is a particular type of structure. Step S110 may include determining a particular type of defect. A characteristic determined in step S110 may include a range of a characteristic of a feature. For example, step S110 may include determining a particular compositional range of structure.

The method may end after step S110. Other processing may follow step S110. In some embodiments, the method may be repeated as necessary. For example, the method of FIG. 10 may be performed a first time when the method is focused on a particular type of structure, and may be performed a subsequent time while focusing on another type of structure. A sample may be determined to include SRAM-WCMP devices, and it may be determined that the sample includes a large number of NMOS MOSFETs. It may be determined that there is an optimal point (e.g., P=Py) around which it may be effective to perform evolution based on the type of structures included in the sample. Therefore, threshold T may be set to a relatively low number and the method of FIG. 10 may be performed to determine characteristics of features that may focus on structures of NMOS MOSFETs, such as NMOS source or drain terminals. Thereafter, the method of FIG. 10 may be adjusted according to another type of structure and performed again. Throughput may be enhanced by reducing threshold T and initially setting a level of parameter P around a predetermined point.

In some embodiments, a method of detecting defects may be provided. The method may involve operating a charged particle beam apparatus. The charged particle beam apparatus may include a primary source configured to generate primary irradiation that includes a primary beam of a charged particle beam apparatus, and a secondary source configured to generate secondary irradiation. The secondary source may be configured to generate secondary irradiation at a predetermined level of parameter P. The parameter P of the secondary irradiation may include the power or wavelength of a laser diode.

Figure 11:
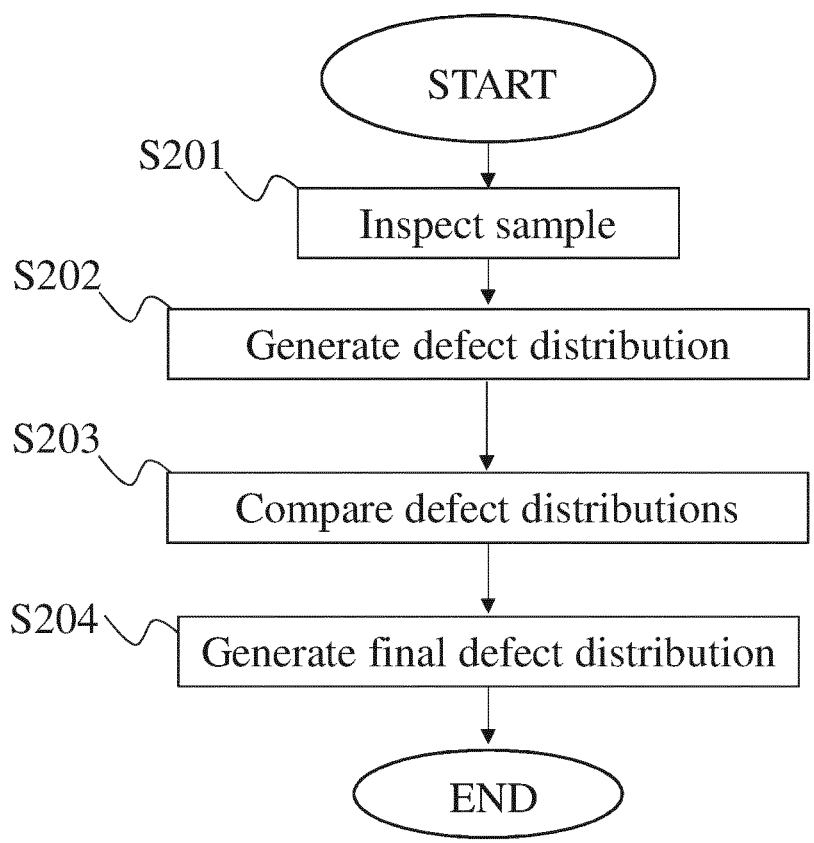
FIG. 11 is a flowchart illustrating a method of detecting defects consistent with embodiments of the present disclosure.

FIG. 11 illustrates a method of detecting defects consistent with embodiments of the present disclosure. The method of FIG. 11 may be executed by a controller, such as controller 109. Controller 109 may issue instructions to components of a charged particle beam system, for example, or other system to accomplish certain functions. Upon starting of the routine of FIG. 11, the method may proceed to step S201. Step S201 may include inspecting a sample. Step S201 may include performing e-beam imaging on the sample. Performing e-beam imaging may include generating a primary charged particle beam by a charged particle beam apparatus and projecting it on the sample. Step S201 may include, for example as shown in FIG. 2, generating primary beam 241 by electron beam tool 100 and may include generating secondary irradiating beam 242 by secondary source 200. Step S201 may include acquiring an image. Step S201 may include acquiring an evolved image. Step S201 may be performed at a predetermined value of parameter P of secondary irradiation and may be performed at a range of values of parameter P. Step S201 may include performing voltage contrast imaging. Step S201 may include performing image processing.

Next, the method may proceed to step S202. Step S202 may include generating a defect distribution. Generating the defect distribution may be based on the sample inspection of step S201. Step S202 may be performed based on e-beam imaging while secondary irradiation is applied. Step S202 may include identifying and confirming defects. Step S202 may include generating a plot, such as a histogram, representing defects. Step S202 may include determining parameters of a defect distribution, such as a mean, median, standard deviation, etc. As shown in FIG. 9B, defect distribution may include a median line superimposed thereon.

Next, from step S202 in the method of FIG. 11, the method may proceed to step S203. Step S203 may include comparing defect distributions. Step S203 may include comparing a defect distribution generated in step S202 to another distribution. Other distributions may include previously generated distributions, or pre-stored distributions, for example. Other distributions may include distributions corresponding to imaging performed at differing levels of parameter P of secondary irradiation. Step S203 may include comparing a first distribution generated by imaging at a first level of parameter P to a second distribution generated by imaging at a second level of parameter P, and so on. Varying parameter P may include varying a wavelength or power of secondary irradiation. Step S203 may include performing repeatability analysis.

Next, the method may proceed to step S204. Step S204 may include generating a final defect distribution. Step S204 may include generating tables based on results of defect detection analysis. Step S204 may include generating first table 921 and second table 922, for example as discussed above with respect to FIG. 9B. Step S204 may include modifying an existing defect distribution. Step S204 may include adding defects captured in other defect distribution so that a single defect distribution reflects defects detected with imaging at differing levels of parameter P.

The method may end after step S204, or other processing may follow. The method of FIG. 10 may be combined with that of FIG. 11. A method may include elements of the flowcharts of FIG. 10 or 11 with or without various modifications.

In some embodiments, identifying defects may include comparing curves, such as those generated in step S108 of the method of FIG. 10. For example, step S202 in FIG. 11 may include comparing curves, as in step S109 in FIG. 10. A defect may be confirmed based on a comparison of an imaged feature's curve to a standard defect curve, for example.

In some embodiments, a method of mapping may be provided. A method of mapping may include determining a characteristic of a plurality of features on a sample. The characteristic may be electrical resistance. The method may include imaging a sample, for example by the method of FIG. 10, and generating a map of resistance of features on the sample. In some embodiments, the method may include generating a map of composition of features on the sample.

The embodiments may further be described using the following clauses:

1. A charged particle beam system comprising:
   a primary source configured to emit a charged particle beam along an optical axis onto a region of a sample;
   a secondary source configured to irradiate the region of the sample; and a controller having circuitry and configured to:
control the charged particle beam system to change a parameter of an output of the secondary source;
acquire a first image of the sample at a first parameter of the output of the secondary source; and
acquire a second image of the sample at a second parameter of the output of the secondary source.

2. The charged particle beam system of clause 1, wherein the controller is configured to acquire a base image of the sample, wherein the base image of the sample is acquired using only the primary source.

3. The charged particle beam system of clause 1 or clause 2, wherein
the controller is configured to acquire a plurality of images of the sample over a range of the parameter.

4. The charged particle beam system of one of clauses 1-3, further comprising an image acquirer, wherein the image acquirer is configured to acquire the first image and the second image.

5. The charged particle beam system of clause 4, wherein the controller includes the image acquirer.

6. The charged particle beam system of any one of clauses 1-5, further comprising:
a dual-output source, wherein the primary source and the secondary source are included in the dual-output source.

7. The charged particle beam system of any one of clauses 1-5, wherein the primary source and the secondary source are spaced apart from one another.

8. The charged particle beam system of any one of clauses 1-7, wherein
the primary source is configured to emit the charged particle beam to generate a first beam spot on the sample, and
the secondary source is configured to emit a secondary irradiating beam to generate a second beam spot on the sample.

9. The charged particle beam system of clause 8, wherein a size of the first beam spot and the second beam spot are substantially equal.

10. The charged particle beam system of any one of clauses 1-9, wherein
the controller is configured to determine a characteristic of a feature in the region of the sample based on an image acquired at a predetermined value of the parameter.

11. The charged particle beam system of any one of clauses 1-10, wherein
the controller is configured to generate a curve based on a plurality of images acquired at varying values of the parameter.

12. The charged particle beam system of any one of clauses 1-11, wherein
the controller is configured to generate a curve of a grey level variation of a feature in the region of the sample based on the first image and the second image.

13. The charged particle beam system of any of clauses 1-12, wherein
the secondary source includes a laser diode.

14. The charged particle beam system of any of clauses 1-13, wherein
the secondary source is configured to emit photons.

15. A method of imaging comprising:
emitting a charged particle beam onto a region of a sample;
irradiating the region of the sample with a secondary source;
acquiring a first image of the sample at a first parameter of the output of the secondary source;
changing a parameter of an output of the secondary source; and
acquiring a second image of the sample at a second parameter of the output of the secondary source.

16. The method of clause 15, further comprising:
acquiring a base image of the sample while the secondary source is not irradiating the region of the sample.

17. The method of any of clause 15 or clause 16, wherein the parameter includes a power of the output of the secondary source.

18. The method of any of clauses 15-17, wherein the parameter includes a wavelength of the output of the secondary source.

19. The method of any of clauses 15-18, further comprising
determining a characteristic of a feature in the region of the sample based on an image acquired at a predetermined value of the parameter.

20. The method of any of clauses 15-19, further comprising
generating a curve based on a plurality of images acquired at varying values of the parameter.

21. The method of any of clauses 15-20, further comprising
generating a curve of a grey level variation of a feature in the region of the sample based on the first image and the second image.

22. A method of detecting defects, comprising:
inspecting a sample using a charged particle beam incident on a region of the sample, and irradiating the region of the sample with a secondary source;
generating a first defect distribution at a first value of a parameter of an output of the secondary source; and
generating a second defect distribution at a second value of the parameter.

23. The method of clause 22, further comprising
comparing the first defect distribution and the second defect distribution; and
determining a final defect distribution.

24. A method of scanning a wafer with an electron microscope, the method comprising:
scanning a first location on a sample a plurality of times with the electron microscope;
during each of the plurality of times, irradiating the first location with light from a laser; and
adjusting a parameter of the laser between the plurality of times so that energy or frequency of light irradiating the first location differs between the plurality of times.

25. The method of clause 24, wherein
the first location corresponds to a pixel in an image generated by the electron microscope.

26. The method of clause 24, further comprising:
determining a characteristic of a feature at the first location on an image acquired at a predetermined value of the parameter.

27. The method of clause 26, wherein the characteristic includes a grey level of the feature.

28. The method of clause 25, further comprising:
determining a grey level of the pixel.

29. The method of clause 27, wherein the characteristic includes a trend of grey level variation of the feature at differing values of the parameter.

30. The method of clause 27, wherein the characteristic includes a trend of grey level variation of the feature at differing amounts of the energy or frequency of the light irradiating the first location.
31. The method of clause 28, further comprising:
determining a trend of grey level variation of the pixel at differing values of the parameter.
32. The method of any one of clauses 24-31, further comprising
generating a plurality of images by the electron microscope, each of the plurality of images corresponding to one of the plurality of times; and
generating a curve based on the plurality of images acquired at differing values of the parameter.
33. The method of any one of clauses 24-32, further comprising:
detecting defects on the sample;
generating a first defect distribution at a first value of the parameter; and
generating a second defect distribution at a second value of the parameter.
34. The method of clause 33, further comprising:
comparing the first defect distribution and the second defect distribution; and
determining a final defect distribution.
35. The method of clause 24, further comprising:
scanning a second location on the sample together with scanning the first location the plurality of times.
36. The method of clause 35, further comprising:
comparing a characteristic of the first location to a characteristic of the second location.
37. A scanning electron microscope comprising:
a primary electron source configured to generate a primary electron beam to be scanned across a region of a sample a plurality of times, the region including a first location;
a laser configured to irradiate the first location with light from the laser; and
a controller configured to adjust a parameter of the laser between the plurality of times so that energy or frequency of light irradiating the first location differs between the plurality of times.
38. The scanning electron microscope of clause 37, wherein
the controller is configured to determine a characteristic of a feature at the first location on an image acquired at a predetermined value of the parameter.
39. The scanning electron microscope of clause 37, wherein
the controller is configured to determine grey level of a pixel corresponding to the first location in an image generated by the scanning electron microscope.
40. The scanning electron microscope of clause 37, wherein
the controller is configured to determine a trend of grey level variation of a feature at the first location at differing values of the parameter.
41. The scanning electron microscope of clause 37, wherein
the controller is configured to generate a plurality of images acquired at differing values of the parameter, and
generate a curve based on the plurality of images.
42. The scanning electron microscope of clause 37, wherein
the controller is configured to detect defects on the sample,
generate a first defect distribution at a first value of the parameter, and
generate a second defect distribution at a second value of the parameter.
43. The scanning electron microscope of clause 37, wherein
the laser is installed on a column of the electron microscope.
44. The scanning electron microscope of clause 37 or clause 43, wherein
the laser is configured to scan together with the primary electron source.
45. The scanning electron microscope of clause 37 or clause 43, wherein
the laser is configured to project a beam spot on the sample that is larger than a beam spot of the primary electron beam.

In some embodiments, a source, such as a primary charged particle beam source or a secondary source, may communicate with a controller that controls a charged particle beam system. The controller may instruct components of the charged particle beam system to perform various functions, such as controlling a charged particle source to generate a charged particle beam and controlling a deflector to scan the charged particle beam over a sample. The controller may also perform various other functions such as adjusting a position of the sample. The controller may comprise a storage that is a storage medium such as a hard disk, random access memory (RAM), other types of computer readable memory, and the like. The storage may be used for saving scanned raw image data as original images, and for storing post-processed images. A non-transitory computer readable medium may be provided that stores instructions for a processor of controller 109 to carry out charged particle beam inspection, image processing, defect detection, source evolution, or other functions and methods consistent with the present disclosure. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a ROM, a PROM, and EPROM, a FLASH-EPROM or any other flash memory, NVRAM, a cache, a register, any other memory chip or cartridge, and networked versions of the same.

Block diagrams in the figures may illustrate the architecture, functionality, and operation of possible implementations of systems, methods, and computer hardware/software products according to various exemplary embodiments of the present disclosure. In this regard, each block in a schematic diagram may represent certain arithmetical or logical operation processing that may be implemented using hardware such as an electronic circuit. Blocks may also represent a module, segment, or portion of code that comprises one or more executable instructions for implementing the specified logical functions. It should be understood that in some alternative implementations, functions indicated in a block may occur out of the order noted in the figures. For example, two blocks shown in succession may be executed or implemented substantially concurrently, or two blocks may sometimes be executed in reverse order, depending upon the functionality involved. For example, step S104 in FIG. 10 may be performed before or during step S103. Some blocks may also be omitted. Any one block or multiple blocks may be omitted. For example, step S102 of FIG. 10 may be omitted. A method may include acquiring evolved images without acquiring a base image. It should also be understood that each block of the block diagrams, and combination of the blocks, may be implemented by special purpose hardware-based systems that perform the specified functions or acts, or by combinations of special purpose hardware and computer instructions.

It will be appreciated that the present invention is not limited to the exact construction that has been described above and illustrated in the accompanying drawings, and that various modifications and changes can be made without departing from the scope thereof.

The invention claimed is:

1. A charged particle beam system, comprising:
   a primary source configured to emit a charged particle beam along an optical axis onto a region of a sample to image the region;
   a secondary source configured to emit photons and to irradiate the region of the sample to assist with imaging the region; and
   a controller having circuitry and configured to:
      control the charged particle beam system to change a parameter of an output of the secondary source during a single inspection process; and
      determine whether a feature in a plurality of images of the sample is defective based on a grey level of the feature, wherein:
         the plurality of images are acquired at different values of the parameter of the output of the secondary source; and
         the grey level of the feature is determined from variations of grey levels of the feature across the plurality of images.

2. The charged particle beam system of claim 1, wherein the controller is configured to acquire a base image of the sample, wherein the base image of the sample is acquired using only the primary source.

3. The charged particle beam system of claim 1, further comprising:
   an image acquirer, wherein the image acquirer is configured to acquire the plurality of images.

4. The charged particle beam system of claim 3, wherein the controller includes the image acquirer.

5. The charged particle beam system of claim 1, further comprising:
   a dual-output source, wherein the primary source and the secondary source are included in the dual-output source.

6. The charged particle beam system of claim 1, wherein the primary source and the secondary source are spaced apart from one another.

7. The charged particle beam system of claim 1, wherein the primary source is configured to emit the charged particle beam to generate a first beam spot on the sample, and
   the secondary source is configured to emit a secondary irradiating beam to generate a second beam spot on the sample.

8. The charged particle beam system of claim 7, wherein a size of the first beam spot and the second beam spot are substantially equal.

9. The charged particle beam system of claim 1, wherein the controller is configured to determine a characteristic of the feature in the region of the sample based on an image acquired at a predetermined value of the parameter.

10. The charged particle beam system of claim 1, wherein the secondary source includes a laser diode.

11. The charged particle beam system of claim 1, wherein the controller is configured to determine whether a difference between features in the region is present based on a determination of whether a difference in grey levels is present.

12. The charged particle beam system of claim 1, wherein the controller is further configured to:
   determine a parameter of the output of the secondary source based on the variations of the grey levels where the grey levels between each of the plurality of features is at a maximum;
   select an image of the plurality of images acquired at the determined parameter of the output of the secondary source; and
   determine whether the feature is defective based on the grey levels in the selected image.

13. The charged particle beam system of claim 12, wherein determining whether the feature is defective includes:
   comparing the grey level of the feature with other features in a same row; and
   determining that the feature is defective on a condition that the grey level of the feature is different from an average grey level of the other features in the same row by a predetermined amount.

14. The charged particle beam system of claim 12, wherein determining whether the feature is defective includes:
   comparing the grey level of the feature with an adjacent feature; and
   determining that the feature is defective on a condition that the grey level of the feature is different from a grey level of the adjacent feature by a predetermined amount.

15. A method of imaging, comprising:
   emitting a charged particle beam onto a region of a sample using a primary source to image the region;
   irradiating the region of the sample with a secondary source configured to emit photons to assist with imaging the region;
   adjusting a parameter of an output of the secondary source during a single inspection process; and
   determining whether a feature in a plurality of images of the sample is defective based on a grey level of the feature, wherein:
      the plurality of images are acquired at different values of the parameter of the output of the secondary source; and
      the grey level of the feature is determined from variations of grey levels of the feature across the plurality of images.

16. A non-transitory computer readable medium that stores a set of instructions that is executable by at least one processor of a charged particle beam system to cause the charged particle beam system to perform operations for imaging, the operations comprising:
   causing a primary source to emit a charged particle beam to be emitted onto a region of a sample to image the region;
   causing a secondary source configured to emit photons to irradiate the region of the sample to assist with imaging the region;
   adjusting a parameter of an output of the secondary source during a single inspection process; and
   determining whether a feature in a plurality of images of the sample is defective based on a grey level of the feature, wherein:

the plurality of images are acquired at different values of the parameter of the output of the secondary source; and the grey level of the feature is determined from variations of grey levels of the feature across the plurality of images.

17. The non-transitory computer readable medium of claim 16, wherein the operations further comprise:

determining whether a difference between features in the region is present based on a determination of whether a difference in grey levels is present.

* * * * *